US008645569B2

(12) United States Patent
Farchmin et al.

(10) Patent No.: US 8,645,569 B2
(45) Date of Patent: Feb. 4, 2014

(54) JUXTAPOSITION BASED MACHINE ADDRESSING

(75) Inventors: David W. Farchmin, Grafton, WI (US); David Alan Vasko, Macedonia, OH (US); Brian A. Batke, Novelty, OH (US); Daniel P. Noonen, Mentor, OH (US); David Michael Callaghan, Concord, OH (US); John Joseph Baier, Mentor, OH (US); Scot A. Tutkovics, Sagamore Hills, OH (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 2671 days.

(21) Appl. No.: 10/800,285

(22) Filed: Mar. 12, 2004

(65) Prior Publication Data

US 2005/0204061 A1    Sep. 15, 2005

(51) Int. Cl.
*G06F 15/16* (2006.01)
(52) U.S. Cl.
USPC ........................................................ 709/245
(58) Field of Classification Search
USPC ........................................................ 709/245
See application file for complete search history.

(56) References Cited

U.S. PATENT DOCUMENTS

| | | | |
|---|---|---|---|
| 3,812,947 A | 5/1974 | Nygaard | |
| 4,309,600 A | 1/1982 | Perry et al. | |
| 4,518,958 A | 5/1985 | Cook et al. | |
| 4,598,275 A | 7/1986 | Ross et al. | |
| 4,612,620 A | 9/1986 | Davis et al. | |
| 4,700,197 A | 10/1987 | Milne | |
| 4,728,959 A | 3/1988 | Maloney et al. | |
| 4,742,470 A | 5/1988 | Juengel | |
| 4,803,039 A | 2/1989 | Impink, Jr. et al. | |
| 5,119,104 A | 6/1992 | Heller | |

(Continued)

FOREIGN PATENT DOCUMENTS

| | | |
|---|---|---|
| DE | 3832375 A1 | 3/1990 |
| DE | 4442443 A1 | 6/1996 |

(Continued)

OTHER PUBLICATIONS

A Statistical Modeling Approach to Location Estimation; IEEE Transactions on Mobile Computing; vol. 1, No. 1, Jan.-Mar. 2002; p. 59-69; Roos, et al.

(Continued)

*Primary Examiner* — William Goodchild
(74) *Attorney, Agent, or Firm* — Quarles & Brady LLP; Alexander R. Kuszewski; John M Miller

(57) ABSTRACT

A method and apparatus for use with a plurality of resources integrated within a space for performing a process and a program run by a processor for controlling the process, the method for associating the program with the resources and comprising the steps of identifying at least a first reference point within the space, identifying the relative juxtaposition of at least a first resource with respect to the first reference point and associating the first resource with the program as a function of the relative juxtaposition of the resource to the reference point.

19 Claims, 13 Drawing Sheets

(56) References Cited

U.S. PATENT DOCUMENTS

| | | | |
|---|---|---|---|
| 5,119,401 A | 6/1992 | Tsujimoto | |
| 5,121,331 A | 6/1992 | Lovrenich | |
| 5,202,929 A | 4/1993 | Lemelson | |
| 5,287,266 A | 2/1994 | Malec et al. | |
| 5,347,463 A | 9/1994 | Nakamura | |
| 5,432,702 A | 7/1995 | Barnett | |
| 5,485,634 A | 1/1996 | Weiser et al. | |
| 5,519,878 A * | 5/1996 | Dolin, Jr. | 709/220 |
| 5,544,321 A | 8/1996 | Theimer et al. | |
| 5,548,660 A | 8/1996 | Lemelson | |
| 5,552,806 A | 9/1996 | Lenchik | |
| 5,555,376 A | 9/1996 | Theimer et al. | |
| 5,598,572 A * | 1/1997 | Tanikoshi et al. | 712/30 |
| 5,627,549 A | 5/1997 | Park | |
| 5,642,303 A | 6/1997 | Small et al. | |
| 5,642,353 A | 6/1997 | Roy, III et al. | |
| 5,644,494 A * | 7/1997 | Richardson et al. | 700/223 |
| 5,649,300 A | 7/1997 | Snyder et al. | |
| 5,689,094 A | 11/1997 | Friedli et al. | |
| 5,751,221 A | 5/1998 | Stanfield et al. | |
| 5,825,759 A | 10/1998 | Liu | |
| 5,835,061 A | 11/1998 | Stewart | |
| 5,907,491 A | 5/1999 | Canada et al. | |
| 5,910,799 A | 6/1999 | Carpenter et al. | |
| 5,956,465 A | 9/1999 | Takagi et al. | |
| 5,960,085 A | 9/1999 | de la Huerga | |
| 5,960,341 A | 9/1999 | LeBlanc et al. | |
| 5,978,753 A * | 11/1999 | Eidson | 702/188 |
| 5,991,284 A | 11/1999 | Willenegger et al. | |
| 6,011,487 A | 1/2000 | Plocher | |
| 6,026,304 A | 2/2000 | Hilsenrath et al. | |
| 6,060,993 A | 5/2000 | Cohen | |
| 6,157,368 A | 12/2000 | Fager | |
| 6,167,464 A | 12/2000 | Kretschmann | |
| 6,211,799 B1 | 4/2001 | Post et al. | |
| 6,236,335 B1 | 5/2001 | Goodwin, III | |
| 6,252,867 B1 | 6/2001 | Pfeil et al. | |
| 6,282,455 B1 | 8/2001 | Engdahl | |
| 6,314,337 B1 | 11/2001 | Marcum | |
| 6,321,092 B1 | 11/2001 | Fitch et al. | |
| 6,347,229 B1 | 2/2002 | Zelmanovich et al. | |
| 6,359,711 B1 | 3/2002 | Cole et al. | |
| 6,362,783 B1 | 3/2002 | Sugiura et al. | |
| 6,381,502 B1 | 4/2002 | Rudder et al. | |
| 6,407,719 B1 | 6/2002 | Ohira et al. | |
| 6,418,352 B1 | 7/2002 | Ellis et al. | |
| 6,437,740 B1 | 8/2002 | De Champlain et al. | |
| 6,446,004 B1 | 9/2002 | Cao et al. | |
| 6,453,168 B1 | 9/2002 | McCrady et al. | |
| 6,453,210 B1 | 9/2002 | Belotserkovskiy et al. | |
| 6,496,775 B2 | 12/2002 | McDonald, Jr. et al. | |
| 6,507,762 B1 | 1/2003 | Amro et al. | |
| 6,516,239 B1 | 2/2003 | Madden et al. | |
| 6,546,304 B2 | 4/2003 | Thorvaldsson et al. | |
| 6,574,549 B2 | 6/2003 | Cato et al. | |
| 6,600,418 B2 | 7/2003 | Francis et al. | |
| 6,600,476 B2 | 7/2003 | Mathis et al. | |
| 6,611,755 B1 | 8/2003 | Coffee et al. | |
| 6,615,094 B2 | 9/2003 | Gleis | |
| 6,694,211 B2 | 2/2004 | Hosel | |
| 6,735,630 B1 * | 5/2004 | Gelvin et al. | 709/224 |
| 6,772,043 B1 * | 8/2004 | Zagnoni et al. | 700/193 |
| 6,789,136 B1 * | 9/2004 | Dunstan | 710/8 |
| 6,804,578 B1 | 10/2004 | Ghaffari | |
| 6,813,608 B1 | 11/2004 | Baranowski | |
| 6,839,604 B2 | 1/2005 | Godfrey et al. | |
| 6,847,856 B1 * | 1/2005 | Bohannon | 700/115 |
| 6,895,301 B2 | 5/2005 | Mountz | |
| 6,957,073 B2 | 10/2005 | Bye | |
| 6,993,405 B2 | 1/2006 | Beaulieu et al. | |
| 7,010,379 B2 | 3/2006 | Maske et al. | |
| 7,069,100 B2 | 6/2006 | Monette et al. | |

| | | | |
|---|---|---|---|
| 2001/0003443 A1 | 6/2001 | Velazquez et al. | |
| 2001/0005178 A1 | 6/2001 | Stewart | |
| 2001/0018349 A1 | 8/2001 | Kinnunen et al. | |
| 2001/0021182 A1 | 9/2001 | Wakutsu | |
| 2001/0024174 A1 | 9/2001 | Turner | |
| 2001/0049595 A1 * | 12/2001 | Plumer et al. | 703/22 |
| 2002/0007407 A1 | 1/2002 | Klein | |
| 2002/0008621 A1 | 1/2002 | Barritz et al. | |
| 2002/0030094 A1 | 3/2002 | Curry et al. | |
| 2002/0051430 A1 | 5/2002 | Kasami et al. | |
| 2002/0055924 A1 * | 5/2002 | Liming | 707/100 |
| 2002/0058499 A1 | 5/2002 | Ortiz | |
| 2002/0082720 A1 * | 6/2002 | Birzer et al. | 700/18 |
| 2002/0101375 A1 | 8/2002 | Stilp et al. | |
| 2002/0102995 A1 | 8/2002 | Zelmanovich et al. | |
| 2002/0113969 A1 * | 8/2002 | Case et al. | 356/401 |
| 2002/0118655 A1 | 8/2002 | Harrington et al. | |
| 2002/0123325 A1 | 9/2002 | Cooper | |
| 2002/0125886 A1 | 9/2002 | Bates et al. | |
| 2002/0131446 A1 * | 9/2002 | Metcalf, III | 370/465 |
| 2002/0161633 A1 | 10/2002 | Jacob et al. | |
| 2002/0167417 A1 | 11/2002 | Wells, II et al. | |
| 2002/0169696 A1 * | 11/2002 | Zara et al. | 705/28 |
| 2002/0183979 A1 | 12/2002 | Wildman | |
| 2002/0193900 A1 | 12/2002 | Kinoshita et al. | |
| 2003/0011467 A1 | 1/2003 | Suomela | |
| 2003/0013456 A1 | 1/2003 | Bates et al. | |
| 2003/0023882 A1 | 1/2003 | Udom | |
| 2003/0033410 A1 * | 2/2003 | Kobayashi | 709/225 |
| 2003/0061295 A1 | 3/2003 | Oberg et al. | |
| 2003/0146835 A1 | 8/2003 | Carter | |
| 2003/0185237 A1 * | 10/2003 | Baker, Jr. | 370/469 |
| 2003/0191767 A1 | 10/2003 | Kabala | |
| 2003/0197643 A1 | 10/2003 | Fullerton et al. | |
| 2003/0208302 A1 * | 11/2003 | Lemelson et al. | 700/245 |
| 2003/0234741 A1 | 12/2003 | Rogers et al. | |
| 2004/0073850 A1 * | 4/2004 | Opaterny | 714/43 |
| 2004/0192342 A1 | 9/2004 | Ranganathan | |
| 2004/0193413 A1 * | 9/2004 | Wilson et al. | 704/243 |
| 2004/0203870 A1 * | 10/2004 | Aljadeff et al. | 455/456.1 |
| 2004/0203895 A1 | 10/2004 | Balasuriya | |
| 2004/0203930 A1 | 10/2004 | Farchmin et al. | |
| 2004/0235468 A1 | 11/2004 | Luebke et al. | |
| 2004/0260518 A1 | 12/2004 | Polz et al. | |
| 2005/0021158 A1 | 1/2005 | De Meyer et al. | |
| 2005/0035862 A1 | 2/2005 | Wildman et al. | |
| 2005/0078297 A1 | 4/2005 | Doemens et al. | |
| 2005/0096776 A1 | 5/2005 | Beaulieu et al. | |

FOREIGN PATENT DOCUMENTS

| | | |
|---|---|---|
| DE | 20010529 U1 | 10/2000 |
| DE | 19955646 A1 | 6/2001 |
| DE | 10142279 A1 | 3/2003 |
| EP | 0 472 874 A1 | 7/1991 |
| EP | 0 626 635 A2 | 11/1994 |
| EP | 0 992 921 A2 | 4/2000 |
| EP | 1 058 171 A2 | 12/2000 |
| EP | 1 233 315 A1 | 2/2001 |
| EP | 1 265 118 A1 | 6/2001 |
| EP | 1 138 451 A2 | 10/2001 |
| EP | 1 209 930 A2 | 5/2002 |
| EP | 0 801 342 B1 | 1/2003 |
| GB | 2 274 521 | 7/1994 |
| GB | 2 365 662 | 2/2002 |
| GB | 2 372 365 | 8/2002 |
| WO | WO 95/14938 | 6/1995 |
| WO | WO 96.23340 | 8/1996 |
| WO | WO 98/30045 | 7/1998 |
| WO | 9928797 A1 | 6/1999 |
| WO | WO 99/28797 | 6/1999 |
| WO | WO 99/39219 | 8/1999 |
| WO | WO 00/17737 | 3/2000 |
| WO | WO 00/50919 | 8/2000 |
| WO | WO 01/82032 A2 | 1/2001 |
| WO | WO 01/16607 A2 | 3/2001 |
| WO | WO 01/22118 A2 | 3/2001 |

(56) References Cited

FOREIGN PATENT DOCUMENTS

| WO | 0138897 A1 | 5/2001 |
|---|---|---|
| WO | WO 01/38897 | 5/2001 |
| WO | WO 01/41546 A2 | 6/2001 |
| WO | WO01/82032 A2 * | 11/2001 |
| WO | WO 01/82032 A2 | 11/2001 |
| WO | WO 02/05107 | 1/2002 |
| WO | WO 02/05107 A1 | 1/2002 |
| WO | WO 02/12992 A2 | 2/2002 |
| WO | WO 02/13557 | 2/2002 |
| WO | WO 02/30053 | 4/2002 |
| WO | WO 02/30053 A1 | 4/2002 |
| WO | WO 02/43428 A1 | 5/2002 |
| WO | WO 02/054813 A1 | 7/2002 |
| WO | WO 02/056274 A1 | 7/2002 |

OTHER PUBLICATIONS

A Probabilistic Approach to WLAN User Location Estimation; International Journal of Wireless Information Networks, vol. 9, No. 3, p. 155-164; Roos, et al.

A Statistical Modeling Approach to Location Estimation; Master's Thesis, Univ. Of Helsinki, Department of Computer Science, May 5, 2001, Teemu Tonteri.

An Indoors Wireless Positioning System Based On Wireless Local Area Network Infrastructure (13 pgs), SatNav 2003, Melbourne, Australia Jul. 22-25, 2003, Wang et al.

* cited by examiner

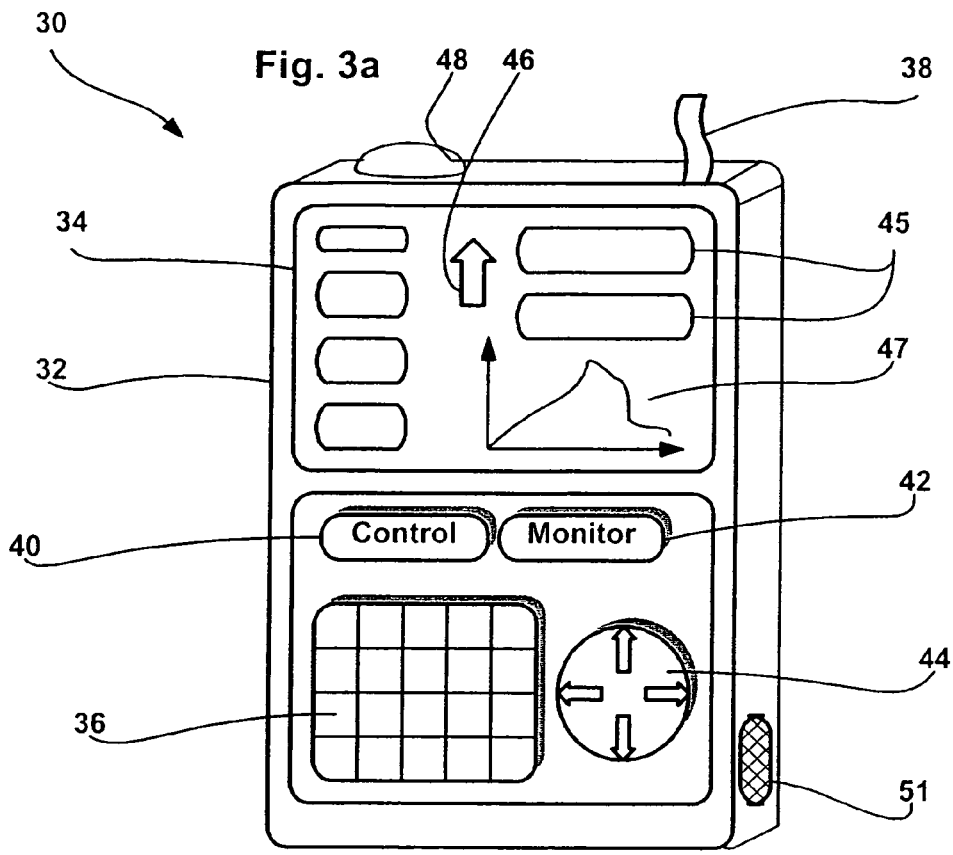
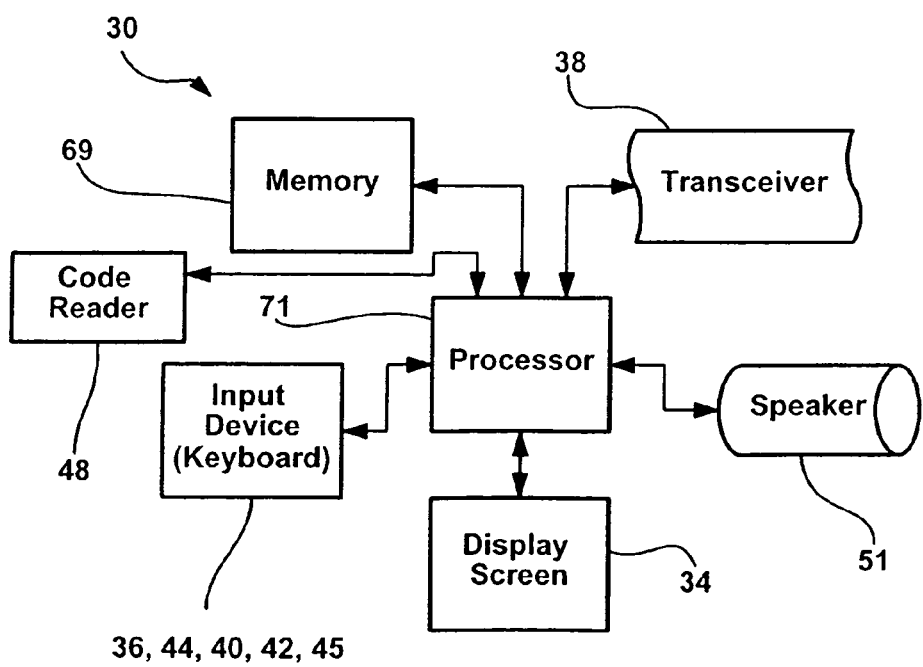

Tag-Address Database

| R-jux Tags | Network Address |
|---|---|
| 1st Station, 1st Device (Anchor Device) | SD82340-03948232 |
| 1st Station, 2nd Device | HJ82033-50230444 |
| 2nd Station, 1st Device | VF982038-2930343 |
| 3rd Station, 1st Device | CD82034-23740203 |
| 3rd Station, 2nd Device | SDL723040-345904 |
| 3rd Station, 3rd Device | AS923400S-884949 |
| 3rd Station, 4th Device | LL90039030-34233 |
| 3rd Station, 5th Device | IO990234-2349495 |
| 4th Station, 1st Device | PP23403-32949931 |
| . . . | |
| 12th Station, 1st Device | ZX990449030-3423 |

Fig. 4

Tag - Address Database

| R-jux Tags | Network Address |
|---|---|
| Transfer Line, 1st Sensor | SD82340-03948232 |
| Transfer Line, 1st Actuator | HJ82033-50230444 |
| Load Station, 1st Sensor | VF982038-2930343 |
| Mill Station, 1st Sensor) | CD82034-23740203 |
| Mill Station, 1st Actuator | SDL723040-345904 |
| Mill Station, 2nd Actuator | AS923400S-884949 |
| Mill Station, 3rd Actuator | LL90039030-34233 |
| Mill Station, 2nd Sensor | IO990234-2349495 |
| Drill Station, First Sensor | PP23403-32949931 |
| . . . | |
| Unload Staiton, 1st Sensor | ZX990449030-3423 |

Fig. 7

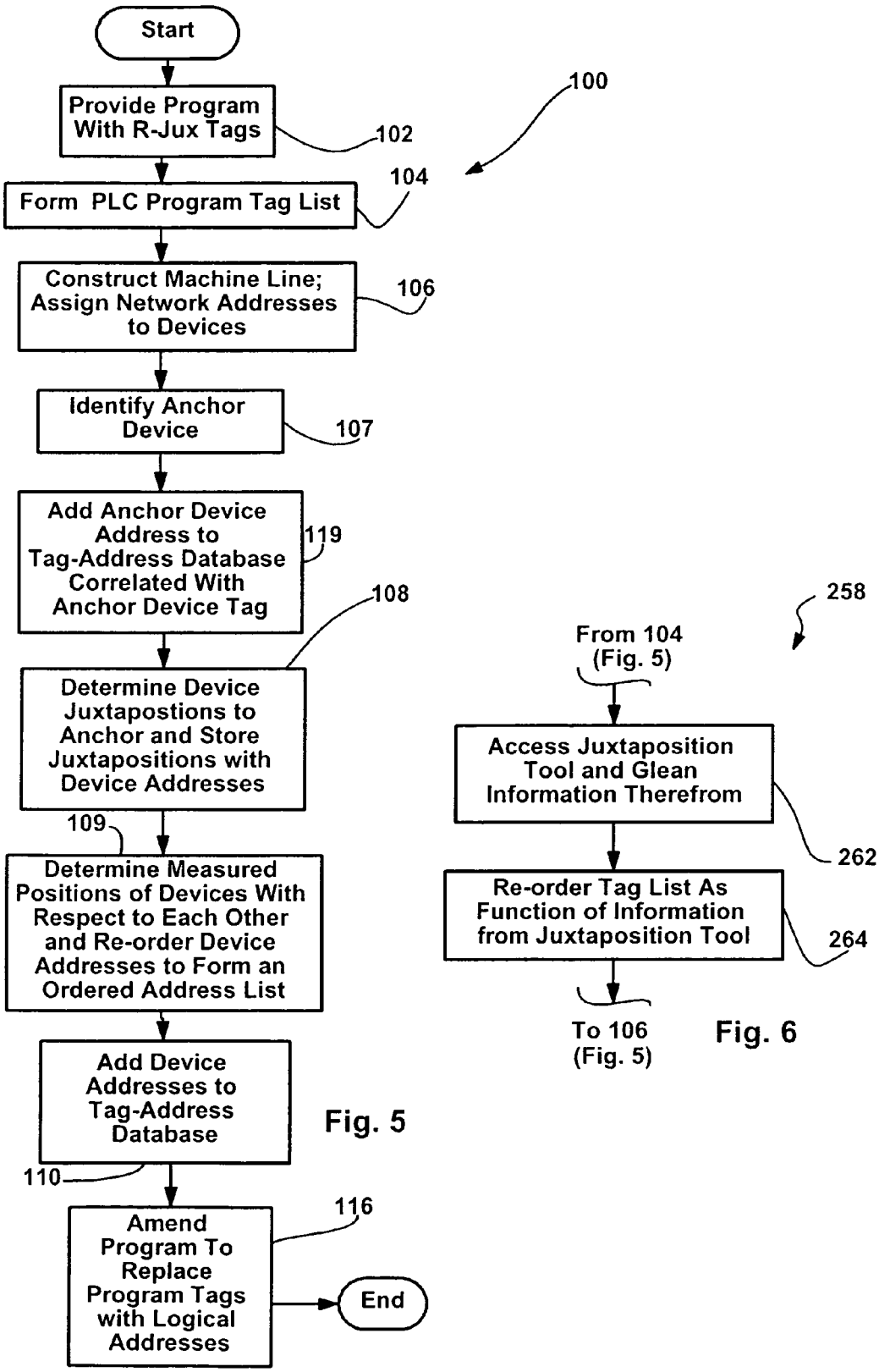

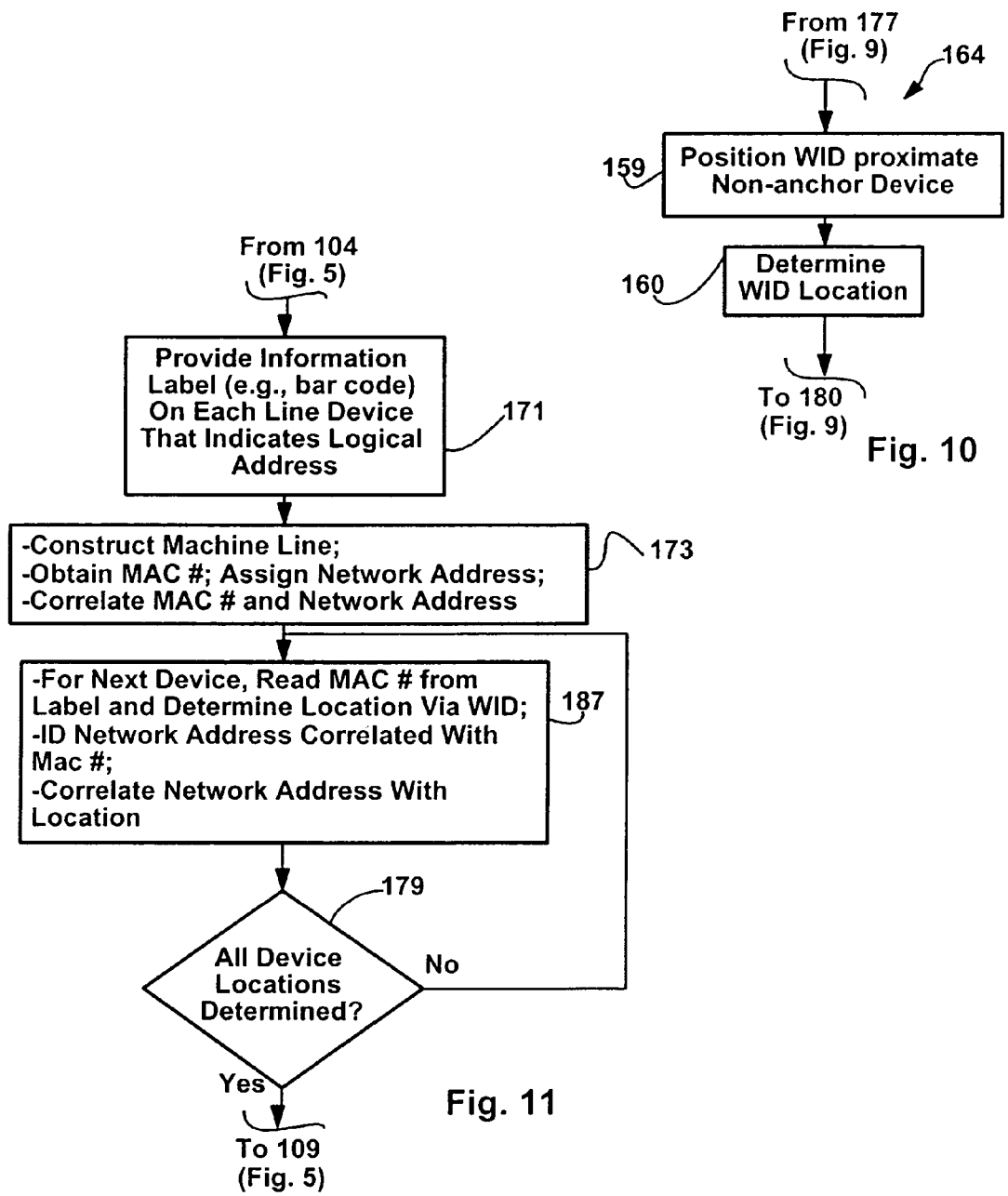

JUXTAPOSITION BASED MACHINE ADDRESSING

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

This invention relates generally to network addressing concepts and more specifically to a method and apparatus for assigning network addresses to resources that are integrated to perform a process controlled by a processor running a program and to a method for verifying addresses as a function of relative juxtapositions of resources that are assigned the addresses.

This section of this document is intended to introduce various aspects of art that may be related to aspects of the present invention described and/or claimed below. This section provides background information to facilitate a better understanding of the various aspects of the present invention. It should be understood that the statements in this section of this document are to be read in this light, and not as admissions of prior art.

In many industries machines are integrated together to form assemblies for performing automated processes. For example, in the automobile industry, machine lines that include several hundred machines and several thousand sensors and actuators are common. In many of these cases various machines and associated controllers have to communicate with each other to harmonize the manufacturing process. Thus, for instance, where a machine line includes a conveyor or transfer line that transfers a work product from station to station during operation, in many cases, the transfer line has to come to a complete stop before other machines at the serial work stations can perform their parts of the machining process. Here, in at least some cases, commencement of machining at the separate stations must be tied to a signal from a sensor indicating that transfer line movement has ceased.

Hereinafter, devices and machines that are assembled together to perform a process and that have some need to communicate with other devices and machines will be referred to generally as resources or devices unless indicated otherwise. Thus, for instance, sensors and actuators will generally be referred to as resources or devices. Similarly, a controller (e.g., a programmable logic controller) will be referred to generally as a resource. As another instance, a machine that includes several sensors and actuators may, in combination, be referred to as a resource. In addition, the product or assembly that is being processed by a machine will be referred to as a "work product".

Several companies that specialize in automated systems have provided systems that have essentially completely "flat" communication networks to facilitate communication between system resources. For instance, Ethernet systems are now employed in some facilities where each resource within the facility is assigned a unique logical network address. Here, in some cases, a first resource can communicate with a second resource by tagging information with the Ethernet address of the second resource. In other cases, resources may be programmed to "listen" on the network for transmissions tagged by other resources as originating from the other resources and may then consume information in the transmissions when the originating resource is one from which information is sought.

In many cases an Ethernet may be extremely large. For example, in some cases all of the resources within a multi-acre facility may be linked to the same Ethernet. In other cases all of the resources that are in any facility owned by a specific manufacturer may be linked to the same Ethernet. In these cases, for instance, a sensor in Wisconsin could be used to trigger an actuator in Arizona where the sensor and actuator are networked in some fashion.

A typical machine line design and build process includes several different phases. Initially, an engineer may generate a conceptual document indicating how a process should proceed to provide a final work product. Thereafter, an engineer may generate mechanical and electrical schematic diagrams (hereinafter "line schematics") to indicate how various resources should be configured and linked together to construct a machine line to perform the intended process. During this design phase, the engineer may identify a number of stations along the line at which different process steps should occur, the mechanical and electrical resources (e.g., drill assemblies, mill assemblies, spray assemblies, clamp assemblies, transfer lines, etc.) to be located at each of the stations, actuators and sensors to be located at stations and their locations at the stations and a number of programmable logic controllers (PLCs) required to control the line resources.

Next, a programmer may write program code for controlling the entire line process. Here, the code will typically include intuitive input and output tags that correspond to sensors and actuators in the line schematics, respectively. For instance, one intuitive tag may be "mill station, $1^{st}$ sensor" while another may be "drill station, $2^{nd}$ actuator". Here, the tags are selected by the programmer to reflect the actual resources that the inputs and outputs are related to so that subsequent association of specific inputs and outputs with specific sensors and actuators will be relatively intuitive simplified.

After the code has been written for controlling a line, an engineer assembles the actual line resources to construct the line pursuant to the electrical and mechanical schematics. Here, in the case of a flat network, each of the sensors and actuators is typically issued a unique network address upon assembly with the other line components. To this end, in the case of a flat Ethernet system, the manufacturer of each sensor, actuator or other device to be assigned a network address typically provides a unique Media Access Control (MAC) address or number to the device as a unique identification number for the device. When the device is linked to a network within an enterprise, the MAC numbers is replaced by a unique network address that comports with an addressing convention employed by the enterprise. Hereinafter, unless indicated otherwise, MAC addresses will be referred to as MAC numbers and network addresses will be referred to as addresses in order to avoid confusion.

Here, in at least some cases, a domain name services (DNS) server linked to the network may be programmed to automatically control replacement of the MAC numbers with network addresses. According to at least one address assigning process, when a device is newly linked to the network, the device transmits its MAC number onto the network. The DNS server monitors the network for MAC numbers and, when a new MAC number is identified, identifies an unassigned network address and assigns the unused address to the newly linked device. When a network address is assigned to the device, the address is transmitted to the device and the network address is stored by the device to facilitate subsequent communication. For instance, a first sensor may be assigned a logical network address SD82340-03948232, a second sensor may be assigned the address PP23403-32949931, and so on.

Continuing, after the line has been completely constructed, a commissioning engineer downloads the PLC programs to the PLCs and uses a list of PLC program tags and the mechanical and electrical schematics to associate each of the logical network addresses of the devices to a separate one of the PLC program tags. Thus, for instance, where the sensor having logical address SD82340-03948232 is the first sensor along a transfer line and one of the PLC program tags is "transfer line, $1^{st}$ sensor", the engineer may associate the address SD82340-03948232 with the "transfer line, $1^{st}$ sensor" tag.

After all of the tags are associated with separate logical network addresses, in at least some cases, the PLC program tags are replaced by the associated logical addresses. In other cases, the associated tags and addresses are stored in a database which is subsequently used during system operation to link inputs and outputs (i.e., the devices) to the tags in the program. After the tags are replaced by the addresses or the tag-address database is stored, additional commissioning procedures are performed and then the line is ready to be used during normal operation.

While the above process is generally tedious, the phase that requires a commissioning engineer to associate logical device addresses with PLC program tags is one of the more daunting and problematic phases for several reasons. First, many facilities or related facilities include huge numbers of devices (e.g., hundreds or thousands of sensors and actuators) and therefore the tag-address association process takes a great deal of time and patience.

Second, because many facilities include huge numbers of devices, the addressing paradigms adopted by most facilities or enterprises (i.e., a group of related or networked facilities) that include flat networks are extremely complex. For example, typical Ethernet logical addresses include character strings of ten to twenty or more characters required to uniquely distinguish one sensor or actuator from the others. In cases where an engineer has to manually enter network addresses into an interface device to associate the addresses with program tags, data entry errors often occur. For instance, where an address includes a sixteen number-character string, if one of the numbers or characters in the string is wrong or if two of the numbers or characters are inverted, the input or output associated therewith will be wrong and the line will malfunction during operation. For example, a tag-address associating error may result in an actuator in a first facility being activated when a sensor in a second facility that is unrelated to the process in the first facility generates a "sensor tripped" signal.

The typical way to deal with the erroneous tag-address problem described above has been to perform extensive testing procedures after the tags and the logical addresses have been associated and during line commissioning. To this end, common testing procedures often require two or more technicians or engineers where one engineer activates a sensor or transmits an activation signal to an address that is believed to be associated with a specific actuator and another engineer observes resources associated with an expected activity intended to result form the activation. Where an unexpected result occurs, the engineers surmise that a tag-address association is incorrect and take steps to remedy the situation. These associating and commissioning processes are time consuming, tedious and generally require at least one highly skilled employee and therefore are relatively expensive.

Third, in many cases the task of tag-address association is complicated by the fact that the PLC programmer, despite attempting to use PLC tags that will be intuitive to the commissioning engineer, may in fact choose tags that are not intuitive to the commissioning engineer. Here, the task of associating tags and addresses is further complicated and can result in more tag-address associating errors.

Fourth, after tag-address associations and other commissioning processes are complete, often machine line devices have to be replaced during routine maintenance. Here, another addressing exercise, albeit on a smaller scale, has to be performed prior to restarting the line. These maintenance related addressing exercises, while simpler than full commissioning processes, are nevertheless complex and subject to error.

Thus, it would be advantageous to have a system that reduces the complexity of the addressing tasks and that automatically determines if likely addressing errors have occurred.

BRIEF SUMMARY OF THE INVENTION

Certain aspects commensurate in scope with the originally claimed invention are set forth below. It should be understood that these aspects are presented merely to provide the reader with a brief summary of certain forms the invention might take and that these aspects are not intended to limit the scope of the invention. Indeed, the invention may encompass a variety of aspects that may not be set forth below.

It has been recognized that PLC program tags used by programmers typically include some type of information from which relative juxtapositions of devices to be associated with the tags can be determined. For instance, in an exemplary, albeit extremely simple case, a programmer may identify sensors and actuators uniquely as a function of relative juxtaposition along a single machine line transfer axis (e.g., an X axis) as a first device, a second device, a third device and so on. As another instance, in a more complex case, a programmer may provide tags that can be used in conjunction with some other information tools to identify the relative juxtapositions of devices to be associated with the tags. For example, where relatively more descriptive tags like "mill station, $1^{st}$ sensor", "drill station, $2^{nd}$ actuator", and so on, are employed in a PLC program that is associated with a line schematic that uses the same tags to identify specific sensors and actuators and their relative juxtapositions or from which the relative juxtapositions of the specific sensors and actuators can be determined, a processor (e.g., a controller) can use information from the line schematic to associate the tags with a specific order or relative juxtaposition of devices.

Hereinafter, tags that indicate the relative juxtapositions of devices to which the tags are to be associated with or from which such information can be determined in conjunction with some other information tool (i.e., a line schematic or specification) will be referred to as "R-jux tags". In addition, the relative juxtaposition indicated by an R-jux tag will be referred to as a "tag specified position" while the actual relative juxtaposition of a device in a constructed machine line will be referred to as a "device position".

It has also been recognized that if an addressing processor (e.g., a system processor, controller, DSN server, etc.) can obtain or is provided information indicating device positions of devices linked to a network, network device addresses can be automatically associated with R-jux program tags. For instance, where an addressing processor assigns network addresses to devices prior to correlating the network addresses with R-jux tags, once the device positions (i.e., the positions of the devices in a constructed line) are determined, that information can be used to identify specific R-jux tags to be associated with line devices and can correlate the device addresses with the R-jux tags to facilitate subsequent communication. As another instance, where an addressing processor correlates network addresses with R-jux tags prior to assigning network addresses to line devices, after device positions are determined, the device positions can be correlated with the tag specified positions and the addresses correlated with the tags can be assigned to appropriate devices.

Many different ways to provide the device position information to the processor or controller are contemplated. For instance, in some cases a wireless information system is contemplated where wireless access points within a facility are employed along with transmitters on each of the line devices to automatically determine device positions. Here, where devices are separated by at least a minimal distance, location determination need not be extremely accurate where relative juxtaposition is all that is required to assign addresses.

As another instance, in some cases an engineer may be required to manually measure and enter distances between line devices or between line devices and a reference point from which the processor can determine relative juxtapositions. As one other instance, in some cases where a wireless location determining system is provided, the wireless system may be used to automatically determine the positions of at least a sub-set of line devices that are suitably separate from other devices and, for devices having juxtapositions that cannot be automatically determined, an engineer may be required to manually determine device positions and enter information into the system.

In still other cases an engineer may be provided a wireless information device (WID) that includes a transmitter that can transmit information to access points to generate data useable to identify the location of the WID. Here, in some cases, device positions may be determined by placing the WID proximate a device, performing a WID locating process and then associating the WID location with the address of the specific device.

In some cases resources including sub-sets of machine line resources may be assembled and tested at locations separate from the locations at which the assemblies are ultimately employed. For instance, in some cases a manufacturer will assemble and test a sub-set of line devices/resources and then ship the complete assembly to a facility for integration with other line resources. In these cases, the relative locations of the devices/resources that comprise the assemblies may be predetermined and provided along with the assemblies to be used for tag-address associating purposes. Here, in at least some cases, only the relative juxtaposition of the assembly or a single device within the assembly with respect to a reference point will have to be determined and thereafter the processor may be able to use the provided relative juxtaposition information to perform the tag-associating process.

Where addresses are assigned to line devices prior to associating the addresses with R-jux tags, many different ways of determining device network addresses are contemplated. For instance, in the case of devices that include transmitters that cooperate with access points to determine device locations, each device transmitter may transmit its network address as part of the location determining signal. Where device juxtapositions are determined manually, device location may be entered by an engineer manually immediately prior to linking the device to the network. In this case, when the processor identifies a new MAC number of the newly linked device and assigns an unassigned network address thereto, the processor may be programmed to automatically associate the assigned address with the most recently entered device location information. A similar process is contemplated where a WID is used to determine device location.

In some cases a system controller may determine WID location and provide a list of R-jux tags to be associated with devices proximate an instantaneous WID location along with a tool for selecting one of the tags for association with a specific device. Commensurate (e.g., immediately before or immediately after) with selection of a device from the list, a procedure may require an engineer to link the device to the network after which a network address is automatically assigned to the device and is correlated with the selected R-jux tag to facilitate subsequent communication.

According to another aspect of the invention, after a line is configured and after tag-address associations have been made, a process may be performed that is designed as another tag-address association check to make sure that clear associating errors have not occurred. Here, the process may include determining if associations are unlikely as a function of some spatial rule set adopted by a facility or enterprise. For instance, a facility may adopt a rule that devices that comprise one machine line will not communicate with devices associated with other lines and that separate lines will be restricted to separate spaces within a facility. Here, locations of line devices can be used to determine if PLC programs performed by PLCs associated with one line are communicating (e.g., receiving sensor signals from or transmitting actuation signals to) devices that form some other line. Where inter-line communications occur an indication of the communication may be provided so that an engineer can determine if an addressing error has occurred. Many other spatial based rules are contemplated and, in at least some cases, an override function is contemplated so that an engineer can affirmatively override any facility rule.

Consistent with the above, at least some embodiments of the invention include a method for use with a plurality of resources integrated within a space for performing a process and a program run by a processor for controlling the process, the method for associating the program with the resources and comprising the steps of identifying at least a first reference point within the space, identifying the relative juxtaposition of at least a first resource with respect to the first reference point and associating the first resource with the program as a function of the relative juxtaposition of the resource to the reference point.

In addition, at least some embodiments of the invention include a method for use with a plurality of network linked resources located within a space for performing a process, the method for assigning a network address to at least a first resource to enable communication therewith and comprising the steps of identifying at least a first reference point within the space, identifying the relative juxtaposition of the at least a first resource with respect to the at least a first reference point and assigning a first network address to the at least a first resource as a function of the relative juxtaposition of the at least a first resource to the reference point.

Other inventive embodiments include a method for use with a plurality of network linked resources located within a space for performing a process, the method for assigning a network address to at least a first resource to enable communication therewith and comprising the steps of providing a wireless locating system within the space including at least a first sensor, using the locating system to identify the locations of at least a first sub-set of the resources, manually determining the locations of at least a second sub-set of the resources, using the resource locations to identifying the relative juxtapositions of at least a sub-set of the resources and assigning network addresses to at least a sub-set of the resources as a function of the relative juxtapositions of at least a sub-set of the resources.

Still other embodiments include a method for use with a plurality of network linked resources located within a space for performing a process and a processor running a program to control the process, each resource referenceable on the network by a network address, the program including tags useable to identify tag specified positions of resources within the space, the method for associating network addresses of the resources with program tags and comprising the steps of identifying the relative juxtapositions of the resources within the space, identifying the tag specified positions within the space, comparing the relative juxtapositions of the resources and the tag specified positions and when a relative juxtaposition for a resource indicates a tag specified position associated with a tag, associating the address of the resource and the tag.

According to one aspect, some embodiments of the invention include a method for use with at least first and second resources to be arranged to perform a process within a space, the method for validating likely correct resource communications and comprising the steps of specifying that a first resource communicates with a second resource, identifying the relative juxtapositions of the first and second resources, determining if the relative juxtapositions of the first and second resources are improbable and where, the relative juxtapositions of the first and second resources are improbable, performing a secondary function.

Some inventive embodiments include a method for use with at least first and second resources to be arranged to perform a process within an environment, the method for validating likely correct resource communications and comprising the steps of specifying a first spatial relationship between first and second resources, determining if the specified spatial relationship between the first and second resources is improbable and where, the specified spatial relationship between the first and second resources is improbable, performing a secondary function.

Still other embodiments include a method for use with a plurality of resources to be arranged to perform a process, the method for validating likely correct resource communications and comprising the steps of providing a rule set including rules that indicate probable relative resource positions, correlating logical network addresses with environment locations, specifying first and second network addresses for a first and a second resources, respectively, specifying that the first resource communicates with the second resource, identifying the network addresses of the first and second resources, using the network addresses of the first and second resources to determine the relative positions of the first and second resources, determining if the first and second resource relative positions are consistent with the rule set and where the relative positions of the first and second resources are inconsistent with the rule set, performing a secondary function.

According to some embodiments the invention includes a method for use with a plurality of resources to be linked via a network within an environment to perform a process and a processor running a program to control the process, the program including at least one of a program input and a program output tag for each of the resources, the method for facilitating association of tags and resources and comprising the steps of associating a space within the environment with the process, providing at least a first information device, determining the location of the information device within the environment and when the information device is proximate at least a sub-space within the space, identifying the resources to be positioned within the sub-space, identifying the tags associated with the resources and indicating the tags associated with the resources.

In addition to the methods above, the invention also includes an apparatus including a processor that may be programmed to perform any of the methods described herein or obvious variations thereof.

These and other objects, advantages and aspects of the invention will become apparent from the following description. In the description, reference is made to the accompanying drawings which form a part hereof, and in which there is shown a preferred embodiment of the invention. Such embodiment does not necessarily represent the full scope of the invention and reference is made therefore, to the claims herein for interpreting the scope of the invention.

BRIEF DESCRIPTION OF THE SEVERAL VIEWS OF THE DRAWINGS

The invention will hereafter be described with reference to the accompanying drawings, wherein like reference numerals denote like elements, and:

FIG. 3a is a perspective view of an exemplary wireless information device (WID) useable to facilitate aspects of some of the inventive methods;

FIG. 3b is a schematic diagram illustrating various components of the WID of FIG. 3a;

FIG. 4 is a schematic diagram illustrating an exemplary tag/address database;

FIG. 5 is a flow chart illustrating a substantially automated method for associating network addresses of devices with PLC program tags;

FIG. 6 is a flow chart illustrating a method similar to FIG. 5;

FIG. 7 is a schematic diagram illustrating another tag/address database similar to the database of FIG. 4;

FIG. 10 is a sub-process that may be substituted for a portion of the process of FIG. 9;

FIG. 11 is a flow chart illustrating yet one more method according to certain embodiments of the present invention;

DETAILED DESCRIPTION OF THE INVENTION

Figure 1:
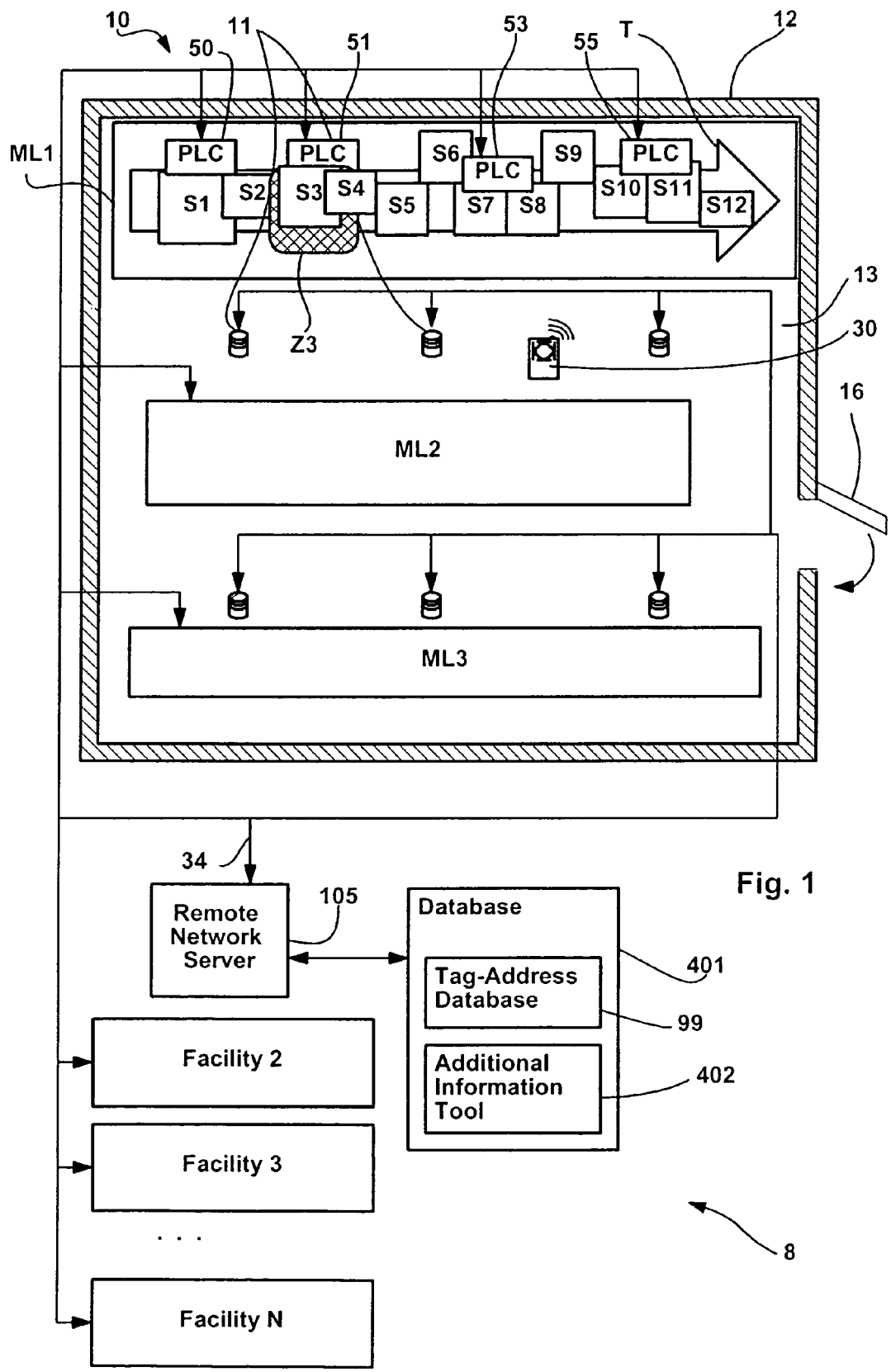
FIG. 1 is a schematic view of an exemplary automated enterprise including a plurality of facilities, each facility having a plurality of machine lines and a network control system therefore.

One or more specific embodiments of the present invention will be described below. It should be appreciated that in the development of any such actual implementation, as in any engineering or design project, numerous implementation-specific decisions must be made to achieve the developers' specific goals, such as compliance with system-related and business related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure. Furthermore, while various methods are described herein where method steps or sub-processes are shown as taking place in a specific sequence, it should be appreciated by one of ordinary skill in the automated processing arts that the order of at least some of the steps may be modified without affecting the end result.

Hereinafter the terms device and resource will be used generally to refer to machine line components within a flat or at least partially flat network that are separately addressable or addressed. For instance, exemplary devices or resources include sensors, actuators, PLCs, etc.

Referring now to the drawings wherein like reference numbers correspond to similar elements throughout the several views and, more specifically, referring to FIG. 1, the present invention will be described in the context of an exemplary, albeit simplified, schematic plan view of an enterprise 8 including N facilities, one of which is labeled facility 10. Facility 10 includes a rectilinear facility floor space or area 13 confined by four facility walls collectively identified by numeral 12. In the exemplary facility 10, entire area 13 comprises a single room (i.e., there are no wall partitions within facility 10 and the entire facility resides on a single level). A doorway 16 is provided to allow access to area 13.

Exemplary facility 10 includes three separate automated machine lines identified by labels ML1 through ML3. The lines ML1 through ML3 are shown as being different sizes to visually illustrate that the lines may have different physical footprints. For the purposes of this invention, the nature of each of lines ML1-ML3 is similar and therefore, unless indicated otherwise, the invention will be described in the context of line ML1 to simplify this explanation. Although not illustrated, it is contemplated that each of the other facilities in addition to facility 10 would have characteristics similar to the characteristics of facility 10.

Figure 2:
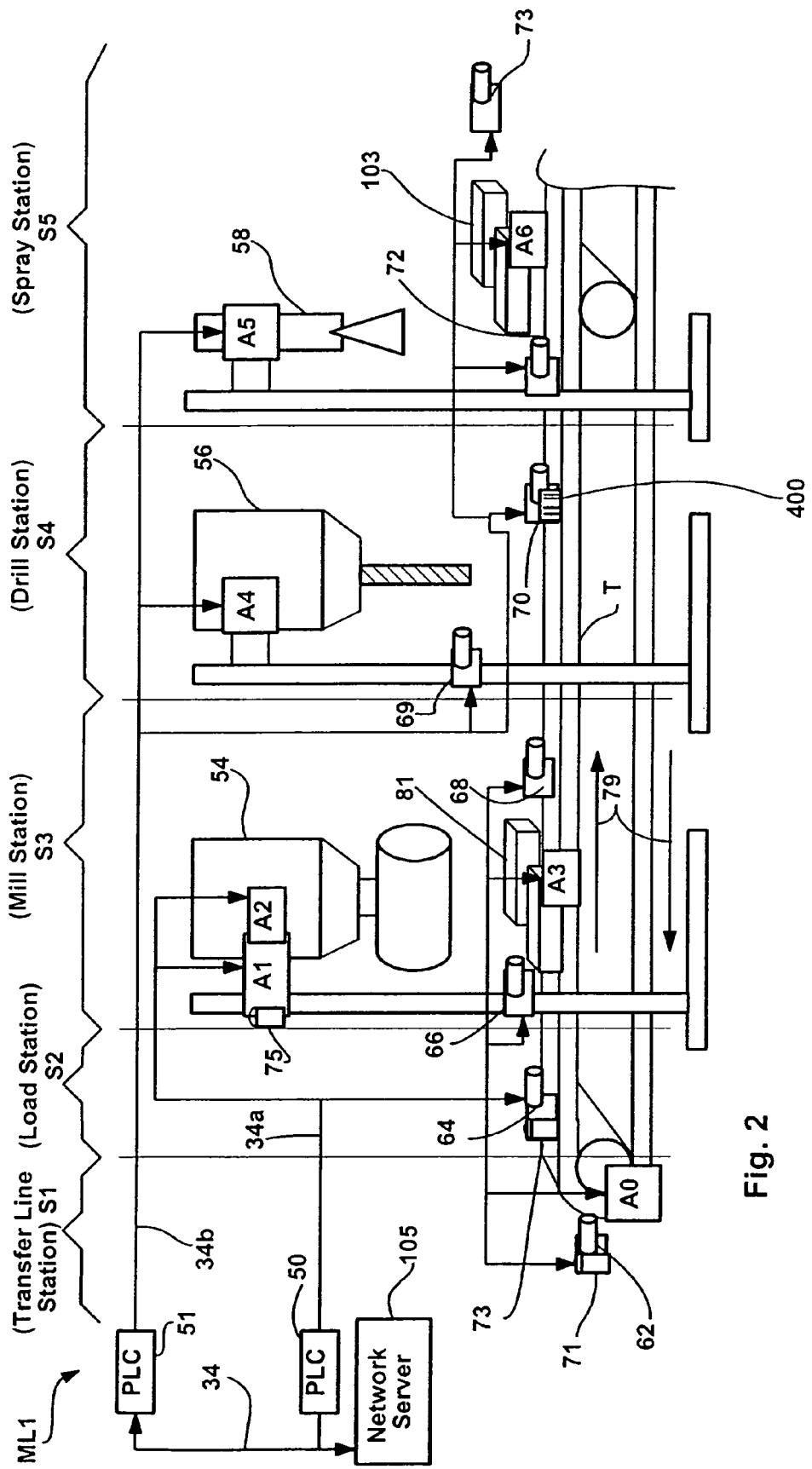
FIG. 2 is a schematic diagram illustrating a portion of a first machine line of FIG. 1 in greater detail.

Referring to FIGS. 1 and 2, line ML1 includes a plurality of line stations labeled S1 through S12. The line stations are generally aligned along a transfer conveyor or line T represented by a large arrow, the arrow head indicating the direction of line transfer from left to right during line operation. Line ML1 is provided to perform some manufacturing process whereby one or more separate process steps occur at each of stations S1 through S12. For instance, a transfer line control process may occur at station S1, a supply loading process may occur at station S2, a milling process may occur at station S3, a drilling process may occur at station S4, and so on. Between process steps, as its label implies, transfer line T transfers a work product from one station to the next station so that process steps can be performed in a sequential and defined order.

Referring still to FIGS. 1 and 2, it is contemplated that each of stations S1 through S12 includes at least one and, in many cases, a plurality of sensing devices (e.g., 62, 64, etc) that sense assembly operating characteristics and provide signals that can be used to facilitate station monitoring and to sequence both intra-station operations and inter-station operations (i.e., operations between the stations that comprise line ML1). For instance, in the case of a drilling assembly, sensors may include limit switches that are tripped when a drill slide reaches various positions along a travel path, on/off switches, speed sensing switches, motor operating characteristic sensors, proximity switches etc.

It is also contemplated that most, if not all, of stations S1 through S12 will include a plurality of actuators (e.g., A0, A1, etc.) for causing station components to perform station functions. For instance, a first actuator at a mill station may be for controlling rotation of a mill head, a second actuator may be for controlling a slide arm of a mill head, a third actuator may be for controlling movement of a clamping device for clamping a product in a specific location prior to beginning a milling process and so on.

Referring still to FIG. 2, exemplary station S1 is a transfer line control station, station S2 is a loading station, station S3 is a mill station, station S4 is a drill station and station S5 is a spraying station. Stations S1 through S5 are arranged sequentially along transfer line T that comprises a conveyor belt that moves in the directions indicated by arrow 79 (i.e., the direction of line transfer). A single actuator A0 and a single sensor 62 are associated with line T at station S1. Actuator A0 controls a transfer line motor and hence movement of line T and sensor 71 determines when line T stops moving. Loading station S2 includes a single sensor 64 positioned with respect to the front end of the transfer line T to sense when a work product is present on the front end of line T.

Station S3 includes a milling assembly generally identified by numeral 54 and a clamp assembly 81. Milling assembly 54 includes a mill head actuator A1 and a slide arm actuator A2 for turning on a motor that controls the mill head and a motor that controls movement of the slide arm, respectively. Clamping assembly 81 includes a clamp actuator A3. Two sensors are provided at station S2 including a sensor 66 for sensing when clamp jaws are closed and a sensor 68 for sensing when a work product is in a specific and desired location at station S3. In operation, with the jaws of clamp assembly 81 initially open, when a work product is moved into station S3 via line T, once sensor 68 senses the front end of the work product, transfer line T halts. Next, the clamp actuator A3 is actuated causing a clamp motor to close the clamp jaws onto the work product to secure the product below a milling bit thereabove. Once the product is secured, the head actuator A1 actuates the mill head motor and then the slide arm actuator A2 actuates the slide arm motor to move the mill head downward toward the product. Sensor 66 senses when the mill head has reached a desired depth within the product at which point the slide arm motor is reversed so that the bit moves upward and toward a parked position. After the bit is parked, clamp actuator A3 causes the clamp motor to open and park the clamp jaws. Thereafter, transfer line T transfers the work product from station S3 to station S4 where additional process steps are performed. Additional sensors and actuators may be provided at station S3 (e.g., a sensor for sensing that the bit is parked, a sensor to sense partial slide arm stroke, a sensor to sense when the clamp jaws are parked, etc.).

Each of stations S4 and S5 include components similar to the components at station S3, albeit arranged in a different fashion to perform a different set of process steps. To this end, station S4 includes a drilling machine 56, a single actuator A4 and two sensors 69 and 70 and station S5 includes a spraying machine 58, two actuators A5 and A6, a clamp assembly 103 (actuator A6 for clamp assembly 103) and two sensors 72 and 73 (sensor 72 for clamp assembly 103).

Referring still to FIGS. 1 and 2, each of the sensors and actuators associated with stations S1-S3 is linked to a programmable logic controller (PLC) 50 via a communication data bus 34*a* so that PLC 50 can receive signals from the sensors and can provide control signals to the actuators at stations S1, S2 and S3. Similarly, each of the sensors and actuators associated with stations S4 and S5 is linked to a PLC 51 via a communication data bus 34*b*. Although the linkages are not illustrated, additional PLCs 53, 55, etc., are provided in FIG. 1 that are linked to separate sets of station sensors and actuators. In some cases the PLCs may also be linked to human-machine interfaces (HMIs) (not illustrated) to enable local monitoring and control of station resources.

Each of the PLCs is linked via a communication network 34 (e.g., a local area network (LAN), a wide area network (WID), an Ethernet, etc.) to a remote network server 105. Thus, the PLCs, sensors and actuators are all linked together via data buses and the communication network 34. Hereinafter, unless indicated otherwise, the data busses 34*a*, 34*b* and network 34 will collectively be referred to as the communication networks 34. The remote server 105 may be located within facility 13 or may be located at some other facility and be linked via the Internet or the like. Server 105 is linked to a database 401 which, in addition to storing programs run by the processor(s) that comprise server 105, also stores other sub-databases such as a tag-address database 99 and an additional information tool 402, each of which is described in greater detail below.

In addition to the components in facility 10 described above, other sensors, actuators and PLCs in lines ML2 and ML3 as well as in the other facilities (see again FIG. 1) are linked to network 34 so that sequencing can be tied across line and facility boundaries. Thus, for instance, a PLC in facility 10 may be programmed to listen on the network for signals from a sensor located in a building miles away from facility 10 or, in some cases, even in another state or country.

Each PLC includes a processor capable of running various types of computer programs that enable the PLC to separately control each station to which the PLC is linked and to safely and precisely sequence station operations with the operations of stations that are controlled by other PLCs linked to the network thereby allowing relatively complex manufacturing processes to be performed in an efficient manner In at least some embodiments, the entire system of control devices and processing devices are linked via a flat network wherein each device is identifiable via a unique network address that comports with an addressing schema or convention used within enterprise 8. For instance, an exemplary network address for sensor 62 may be "SD82340-03948232". Here, for instance, referring again to FIG. 2, when PLC 51 requires the status of sensor 62 to sequence actuation of associated actuator A4, PLC 51 may be programmed to listen on bus 87 for signals tagged as produced by the device assigned address SD82340-03948232 and, when a signal is received, to obtain the signal and use the signal to facilitate actuation of actuator A4. Similarly, where actuator A4 has been assigned network address GL723909-2082302, PLC 81 may activate actuator A4 by sending an actuation signal via bus 87 to the device located at address GL723909-2082302. In a similar fashion, PLC 51 may transmit an actuation signal to an actuator that is located in a different machine line (i.e., ML2, ML3) or that is located in a different facility or may obtain a sensor signal from a sensor in a different line or facility by employing the address of the actuator or sensor.

Referring still to FIG. 1, in addition to the components described above, facility 10 also includes a plurality of communication sensors or access points 11 (only two numbered) and, in at least some embodiments, will include one or more wireless information devices (WIDs) 30 (one illustrated in FIG. 1). Wireless transceivers like access points 11 are well known in the industry and therefore, in the interest of simplifying this explanation, will not be described here in detail. For the purposes of the present invention, it should suffice to say that each access point 11 includes a two-way wireless transceiver that is capable of transmitting and receiving electromagnetic (e.g., radio or infrared) signals within an area proximate the transceiver. Each transceiver 11 transmits information signals which decrease in strength as distance from the transceiver increases. In the illustrated example, six separate access points 11 are provided within area 13 and are generally equi-spaced within area 13.

Typically, access points 11 will be mounted on the ceiling within an area 13 to allow relatively unobstructed communication between an access point 11 and other devices that communicate therewith within area 13. While access points 11 are illustrated as being substantially equi-spaced within area 13, it should be appreciated that other access point arrangements are contemplated and that, in many cases, other access point arrangements may be most suitable given specific assembly layouts, the physical characteristics of each assembly and the layout of machine lines within space 13.

Server 105 is linked to each access point 11 via network 34 and can receive information from the access points 11 and provide information to each of the access points 11 for transmission within area 13 to WIDs 30 or the like. Information transmitted from each access point 11 to server 105 is typically labeled by the access point so that server 105 can determine which access point 11 provided the received information. In the flat network described above, each access point is assigned a unique network address and the labeling process is performed by the access points 11 earmarking data packets with the unique access point identifier labels. In a similar fashion, server 105 and access points 11 are configured such that server 105 can address information to each separate and specific access point 11 via the access point network address.

Referring again to FIG. 2, in at least some embodiments of the invention, the separately addressed sensors and actuators will include transmitters. In FIG. 2 only three transmitters 71, 73 and 75 are illustrated and labeled despite the fact that, in at least some embodiments, each of the line devices will include a separate transmitter. In some cases only one of the devices in each machine line will include a transmitter while in other cases one device at each of the stations will include a transmitter. In some embodiments no transmitters will be included with the devices. When activated, each transmitter transmits Rf or other type known intensity signals that are receivable via access points 11. As with signals transmitted by access points 11, the transmitter signal strengths fall off as distance from the transmitter increases.

Where transmitters are provided on devices, the transmitters are generally closely coupled to the devices so that the location of the transmitter is, for practical purposes, the location of the associated device. Thus, for instance, in the case of a sensor, the transmitter will be closely coupled to the actual sensing component of the sensor device. In the case of an actuator, the transmitter will be closely coupled to where activity associated with the actuation occurs.

Referring now to FIGS. 3*a* and 3*b*, a first relatively simple exemplary WID 30 that may be used with certain embodiments of the present invention is illustrated. Here, it should be noted that exemplary WID 30 described hereafter is relatively feature rich and that, in at least some inventive embodiments, less featured WIDs may be used to perform various aspects of the present invention. For instance, in cases where a WID is only used to determine location of a sensor by placing the WID proximate the sensor and causing a signal to be transmitted to access points 11, it may not be necessary for the WID to include a display device or, for that matter, the ability to receive signals from access points 11. Similarly, the audio output described below on the richly featured WID and other components may not be necessary for performing at least some of the inventive processes described below.

Exemplary WID 30 includes, generally, a plurality of components that are mounted within a hardened plastic or metallic housing identified by numeral 32. Components of exemplary WID 30 include a processor 71, an input device (e.g., keyboard 36), a display screen 34, a speaker 51 for audio output, a transceiver 38, a bar code reader 48 and a memory 69. Processor 71 is linked to each of the input device, display screen 34, speaker 51, transceiver 38, reader 48 and memory 69 for communication therewith.

Processor 71 is equipped to run various programs for both displaying information via screen 34 and for receiving control signals and communicating those control signals to access points 11 (see again FIGS. 1 and 2) via transceiver 38.

The input device may include any of several different types of input components including a typical push-button keyboard 36, separate selection buttons 40 and 42, a rocker-type selection button 44, and/or selectable icons that may be provided via display screen 34 such as, for instance, icons 45. It is contemplated that, in at least one embodiment, a pointing cursor 46 may be movable about screen 34 and placed over one of the selectable icons (e.g., 45) after which a conventional type mouse clicking action may be used to select one of the icons to cause some display or control function to occur. In other embodiments display 34 may comprise a touch screen where icons are selectable via a stylus or the tip of an operators finger.

Display screen 34 may be any type of conventional display screen suitable for a handheld device and, for example, may be equipped to display numeric information, icons, graphs such as graph 47, bar charts, or any other type of monitoring and control information that may be associated with facility machines. Speaker 51 is a conventional small audio output speaker which may be used for any purpose such as providing an audible indication when a WID 30 is removed from a zone, providing operating characteristics in an audible manner, etc.

Transceiver 38 is mounted proximate the top end of housing 32. As in the case of the transceivers that comprise access points 11, transceiver 38 is capable of transmitting electromagnetic signals and also receiving such signals so that information can be provided to server 105 or received from server 105 via access points 11.

Bar code reader 48 is a typical bar code reading device that, when placed proximate a bar code, can be activated to read the code and provide the code information to processor 71. In at least some inventive embodiments, reader 48 is useable to read information from bar code labels provided on sensors and actuators. While reader 48 is described as a bar code reader, other label reader types are contemplated such as Rf ID tag readers, dot matrix readers, and the like.

Memory 69 stores the programs performed by processor 71 and also, in at least some embodiments of the invention, stores a WID identifier (e.g., a WID number, a WID user identification number, etc.).

Server 105 may be programmed to perform various functions. To this end, in at least some cases where a wireless system is used at least in part to determine relative juxtapositions of resources (i.e., sensors, actuators, etc.), server 105 may be programmed to determine resource locations via signals obtained from access points 11. For instance, referring again to FIGS. 1 and 2, in the present example, it is contemplated that when a transmitter (e.g., 71 ) is activated within facility 10, signals are transmitted from the transmitter to at least a subset of the access points, the transmitted signals useable via any of several well known methods to determine the location of the transmitter within the area in question. Similarly, when a WID is activated within facility 10, it is contemplated that the WID 30 and access points 11 may be programmed to cooperate to generate and provide data to server 105 that can be used to determine the instantaneous location of the WID 30. The location determining methods may be based on signal strength or time of flight triangulation or, in some cases, a statistical analysis of received or generated data or a combination of any known location determining methods.

In addition, in at least some cases, server 105 is programmed to manage network addresses on flat network 34. To this end, in at least some embodiments, devices to be addressed or addressable on a network will typically be provided a unique MAC number. When a device with a MAC number is linked to network 34, the device broadcasts its MAC number on network 34 which is recognized and obtained by server 105. Thereafter, server 105 identifies a unique, unused network address and transmits the identified address back to the newly linked device. When the network address is received by the device, the device stores the address to facilitate subsequent communication. Hereinafter, unless indicated otherwise, the process of obtaining a MAC number from a device newly linked to network 34 and assigning a network address which is stored at the device for communication will be referred to as the "device addressing method" to simplify subsequent explanation.

It has been recognized that the task of constructing a machine line that includes components that are located at precise locations is tedious and time consuming. Thus, where a line specification requires a specific spacing between two devices such as first and second sensors along the stroke of a drill slide arm, the task of placing the first sensor and then precisely placing the second sensor a specific distance from the first sensor is tedious. While precise spacing of two sensors may not seem extremely burdensome, in many cases several hundreds and even thousands of devices have to be assembled to form a complete machine line and the combined effort to precisely configure a line is excessive.

Despite the fact that most line specifications express spacing requirements precisely, in many cases, the spacing requirements needn't be precise to facilitate a line process. For instance, referring again to FIG. 2, while the order of the sensors and actuators along the direction of line transfer 79 may be important, in many cases, the precise spacing between sensors and activators may not be important. For example, while actuator A0 may have to be positioned after sensor 62, the precise spacing of sensor 62 and actuator A0 may only have to be within a range of acceptable spacings (e.g., 1 to 4 feet). Similarly, while sensor 64 may have to be positioned after sensor 62, the spacing between sensors 62 and 64 may only have to be within a range of between 1 and 5 feet to meet process requirements. As another instance, actuator A0 may only have to be located between sensors 62 and 64 and the precise location therebetween may not be important. Similarly, while station S3 may have to be positioned after station S2 and before station S4, the exact spacing between the stations may be irrelevant to performing the ultimate process.

Requiring an engineer to precisely space line devices when precise spacing is not required increases the time necessary to configure a line and the complexity of the line configuring task. For this reason, ranges of acceptable spacings are preferable when precise spacing is irrelevant and communication systems that require precise spacing should be avoided.

It has also been recognized that the tasks associated with customizing PLC control programs as a function of station configurations (e.g., the locations of specific sensors and actuators and the network addresses of specific devices) is extremely tedious and time consuming. In this regard, manually assigning device network addresses to PLC program tags is particularly burdensome as described above.

The present invention uses content within PLC program tags (i.e., within R-jux tags) to automate at least some steps in the process of associating program tags with resources/devices. To this end, a data tagging paradigm is adopted wherein intuitive tags used in PLC programs include information that indicates relative juxtapositions of line devices to be associated with the tags. Thus, consistent with the simple example above, according to one inventive embodiment, one tag may be "$1^{st}$ station, $1^{st}$ device" and another tag may be "$11^{th}$ station, $8^{th}$ device" and so on. After a PLC program is written, an engineer constructs a line or a sub-section of a line to be controlled by the program placing all required devices in their intended relative juxtapositions. Thereafter, in at least some embodiments of the invention, server 105 (see again FIG. 1) determines relative juxtapositions of the line devices and assigns device position labels that indicate the relative juxtapositions of the line devices using a labeling protocol that is consistent with the tagging protocol that was used to generate the PLC program tags. For instance, the first device at the first station may be labeled "$1^{st}$ station, $1^{st}$ device". Hereinafter, consistent with the discussion above, a device label that indicates relative juxtaposition of an associated device will be referred to as a "device position label" and PLC program tag that indicates the relative juxtaposition of a device to which the tag is to be associated or that can be used along with other information tools to identify the device to which the tag is to be associated will be referred to as an "R-jux tag".

After each device is labeled with a device position label indicating the device's relative juxtaposition, the device position label of each device is matched with one of the R-jux tags and server 105 performs a process to ensure that network addresses of the devices and network addresses employed by the PLC program are appropriately assigned to carry out the program process. Here, for instance, in at least some embodiments, server 105 may identify the network address associated with a labeled device and use that network address to populate a an R-jux tag—network address database. Thereafter, the tag-address database may be used to automatically modify the PLC programs by replacing the program tags (i.e., the R-jux tags) with the corresponding network addresses. For instance, where the address SD82340-03948232 is assigned to the first device at the first station, address SD82340-03948232 may be used to modify the PLC program by replacing each instance of the tag "$1^{St}$ station, $1^{st}$ device" with address SD82340-03948232.

Referring now to FIG. 4, an exemplary, albeit simplified, tag-address database 99 is illustrated that correlates user provided PLC program tags or R-jux tags with network addresses that have been assigned to machine line devices or resources. To this end, database 99 includes two columns, an R-jux tags column 97 and a network address column 101. As its label implies, tags column 97 includes a list of the tags that appear in PLC programs used to control line ML1. For instance, referring again to FIG. 2, in the present example, it is assumed that a PLC programmer programming the PLCs that are to collectively control line ML1 has provided a tag "1st station, 1st device" for the transfer line station S1, first sensor 62. Similarly, the programmer has employed label "1st station, 2nd device" for the transfer line station S1, first actuator A0, and so on.

Referring still to FIG. 4, address column 101 includes a separate network address that is consistent with the addressing paradigm employed by enterprise 8 for each of the sensors and actuators of line ML1. For example, logical address SD82340-03948232 corresponds to the first sensor 62 associated with transfer line station S1 (i.e., is associated with the "1st station, 1st device" tag in column 97), address HJ82033-50230444 corresponds to the first actuator A0 associated with transfer line station S1 (i.e., corresponds to the "1st station, 2nd device" tag in column 97), and so on. Here, it should be appreciated that database 99 is a complete table and that, prior to performing at least certain processes consistent with some aspects of the invention, the tag-address correlations represented in the database would not exist.

Pursuant to the present invention, server 105 is programmed to perform various processes that at least partially automate the task of customizing PLC programs to communicate with specific line devices as a function of the relative juxtapositions of the devices with respect to each other and their respective network addresses. In general, each method requires that server 105 receive information from which the relative juxtapositions of line devices can be determined and then use information that typically already exists to associate the line devices with R-jux tags. The methods generally differ in the processes for obtaining the information from which device positions can be determined and in the order of associating network addresses with R-jux tags and line devices. In some cases the process of obtaining juxtaposition information is highly automated, in other cases obtaining juxtaposition information is generally manual, while in still other cases obtaining juxtaposition information has both automatic and manual aspects. In some cases unique unused network addresses are assigned to program tags and thereafter to line devices while in other cases the addresses are first assigned to line devices and thereafter to program tags.

Referring now to FIG. 5, an exemplary highly automated method 100 according to at least one aspect of the present invention is illustrated whereby a database akin to database 99 in FIG. 4 may be generated. Referring also to FIGS. 1 and 2, in order to facilitate automated method 100, herein it is assumed that each of the sensors and actuators illustrated in FIG. 2 includes its own wireless Rf transmitter (e.g., 71, 73, 75, etc.) that is capable of transmitting an Rf signal to at least a subset of access points 11 in facility 10 such that data generated by the access points 11 can be used by server 105 to accurately determine the relative juxtapositions of the resources.

Here, the term "accurate" in the present example means that server 105 can uniquely distinguish between the order of devices along the direction of line transfer 79 given the positions of the devices after line ML1 has been constructed. Here, it should be understood that in other configurations the term "accurate" may have a more detailed meaning. For instance, in some cases relative juxtaposition may be important along two axes (i.e., in two dimensions) or along three axes (i.e., in three dimensions). As another instance, in some cases, where ranges of spacing are important, in addition to being able to distinguish order of devices along the direction of line transfer, controller 105 may have to be able to distinguish whether or not device spacings are within specified ranges. For example, referring again to FIG. 2, where sensor 64 must be within two to six feet after sensor 62, accuracy may require that server 105 be able to determine if the necessary spacing exists.

Referring still to FIG. 2, it will also be assumed that a map similar to the illustrated schematic of FIG. 2 is used to configure line ML1. Admittedly the FIG. 2 schematic is not very detailed and it is recognized that a typical line schematic would include much more information to enable proper line configuration. Nevertheless, the simple FIG. 2 schematic is suitable for explaining various aspects of the present invention.

Referring still to FIGS. 1, 2 and 5, at block 102 a PLC programmer provides the PLC program (or programs) that is to be run by the set of PLCs (e.g., 50, 51, etc.) that are to control machine line ML1 to server 105. Here, it is assumed that the PLC program includes R-jux tags that fully specify relative juxtapositions of the line devices (i.e., fully specify the tag specified positions). In this regard, in at least some cases, it is contemplated that the tools used by the programmer to provide the PLC programs may enforce naming conventions that result in tags that include sufficient relative juxtaposition information to facilitate the inventive process. For example, referring once again to FIG. 4, the tagging convention may require tags as rudimentary as the tags indicated in column 97 so that a very specific order of devices along the direction of transfer line movement can be easily determined from tag specified positions. In this case, when a programmer attempts to create a new input or output tag, programming software may require that the programmer generate an R-jux tag that specifies the line station and station device number for the tag. Other more intuitive tagging conventions are contemplated as described in greater detail below.

Continuing, at block 104, server 105 parses the PLC program to identify R-jux tags and forms a list of R-jux tags similar to the list illustrated in column 97 of FIG. 4. Here, the tag list may be stored in the tag-address database 99 to populate column 97 while column 101 remains empty. Because the tag specified positions indicated by the R-jux tags themselves can be used to fully determine the order of devices along the direction of line transfer (see again 79 in FIG. 2), the list in column 97 can be ordered by server 105 when formed to reflect the order along the line ML1. To this end, consistent with the present example and referring to FIG. 4, while R-jux tag "1$^{st}$ station, 1$^{st}$ device" may actually be the 31$^{st}$ tag to appear in the PLC program, after server 105 forms the R-jux tag list, server 105 can re-order the tags in the list to reflect juxtapositions along the transfer line by ordering tags as a function of station number and device number at each station. The list in column 97 reflects a reordering where all first station devices come before second station devices, all second station devices come before all third station devices, the first device at each specific station comes before the second device at that station, and so on.

At block 106, an engineer uses the machine line map or schematic (see FIG. 2) to construct line ML1 including all of the line machines, sensors, actuators, PLCs and network connections as illustrated in FIG. 2. After block 106, the entire line ML1 has been constructed and all of the devices including the sensors and actuators are in their specific and intended device positions for line operation. In addition, at block 106, server 105 performs the device addressing method described above (i.e., automatically uses MAC numbers from linked devices to assign network addresses to devices).

At block 107, server 105 performs some process to identify the location of at least one of the line devices that can be used as a reference point for determining the relative juxtapositions of the other line devices. Hereinafter, the line device used as a reference point will be referred to as an "anchor device".

The process for identifying the location of the anchor device may be either an automated process or a partially manual process aided by an engineer during a commissioning procedure. For instance, in an automated process, a line map or schematic similar to the schematic of FIG. 2 may indicate sensors and actuators that have to be provided in the specific relative juxtaposition wherein a sensor (e.g., sensor 62) must be separated from all of the other sensors and actuators and where all of the other sensors and actuators are tightly integrated together. For example, in FIG. 2, if the line specification required that sensor 62 be at least five feet from the next closest actuator or sensor and that each of the other actuators and sensors was within a foot of another of the actuators and sensors, server 105 may be programmed to identify device 62 by determining which of the line devices is separated from other line devices by at least five feet. The process associated with block 107 requires each sensor and actuator to transmit signals to the access points 11 within facility 10 to generate data used by server 105 to determine the locations and relative juxtapositions of each of the sensors and actuators. Thereafter, server 105 is programmed to identify the sensor and actuator pattern and, more specifically, the sensor that is separated from the other sensors and actuators. Here, it is assumed that, in at least some embodiments of the invention, the signals transmitted by each of the sensors and actuators include some type of an identifier and, more specifically, in at least some embodiments, the logical address of the specific sensor or actuator. Thus, sensor 62 may transmit a signal to access points 11 including the logical address SD82340-03948232, actuator A0 may transmit a signal including the logical address HJ8233-050230444, and so on.

In the case of a partially manual process, an engineer may be required to, during the construction process at block 106, link the anchor device to the network 34 first. Thereafter, server 105 may be programmed to treat the first device as the anchor device. While any of the line devices may operate as the anchor device, hereinafter, unless indicated otherwise, it will be assumed that sensor 62 is the anchor device. Sensor 62 has been indicated as the anchor device in FIG. 4 (i.e., sensor 62 is the first station, first device).

Referring still to FIGS. 1, 2 and 5, at block 119, server 105 associates the anchor device address with the corresponding R-jux tag for the anchor device in database 99. Thus, in the present example, because sensor 62 is the anchor device and sensor 62 has a logical address SD82340-03948232, address SD82340-03948232 is placed in address column 101 in the row corresponding to the "1st station, 1st device" R-jux tag in column 97.

After block 119, at block 108, server 105 determines the juxtapositions of all of the line devices with respect to the anchor device 62 and stores the device juxtapositions with respect to the anchor device along with associated network addresses as correlated pairs. For instance, address HJ82033-50230444 may be stored as a correlated pair with distance "24 inches" meaning that actuator A0 having the address HJ82033-50230444 is 24 inches from the anchor device (i.e., sensor 62), address VF982038-2930343 may be stored as a correlated pair with distance "53 inches" meaning that sensor 64 having the address VF982038-2930343 is 53 inches from the anchor device, and so on. To determine the device positions, each of the device transmitters transmits a signal, preferably including the network address of the device, to access points 11 and server 105 uses the access point data to determine the locations of each of the devices and then the relative juxtapositions of the devices with respect to anchor device 62. Juxtapositions with respect to anchor devices will be referred to as "anchor related positions" hereinafter unless indicated otherwise. Where the process of identifying the anchor device is automated, the signals that were transmitted by the device transmitters for identifying the anchor device may be used to facilitate the process at block 108 so that a second transmission is not required.

Continuing, at block 109, server 105 uses the juxtaposition information from block 108 to identify relative juxtapositions of the devices with respect to each other and to reorder the network addresses of the devices that are included in the correlated pairs to reflect the order of the devices along the direction of line transfer 79. Thus, at block 109, server 105 may simply use the anchor related positions from the correlated pairs formed at block 108 to determine that the device corresponding to address HJ82033-5023044 is the second device along direction 79, that the device corresponding to address VF982038-2930343 is the third device along direction 79, and so on, and reorder the addresses accordingly. At block 110, server 105 associates the device network addresses with the R-jux tags. In the present example the association is simple as both the network addresses and tags are ordered with respect to direction 79 and therefore, the first address in the ordered address list is associated with the first tag in the tag list, the second address is associated with the second tag, and so on. After block 110 control passes to block 116.

At block 116, server 105 amends the PLC program or programs to replace R-jux tags in the program with the network addresses from database 99. For example, referring again to FIG. 4, each time program tag "$1^{st}$ station, $1^{st}$ device" appears in one of the PLC programs, server 105 replaces the "$1^{st}$ station, $1^{st}$ device" tag with network address SD82340-03948232, each time the tag "$3^{rd}$ station, $5^{th}$ device" appears in one of the programs, server 105 replaces the tag with address IO990234-2349495, and so on.

At this juncture, it should be appreciated that an automated process for identifying network addresses of devices that are associated with PLC program tags and for replacing the program tags with the network addresses has been described which appreciably reduces the time required for commissioning a machine line. It should also be appreciated that, because the addressing process is based on relative juxtaposition as opposed to specific device locations, line configuring requirements can be relaxed substantially and therefore configuration or construction time can be reduced appreciably.

It should also be appreciated that, while the example above is relatively simple and assumes that relative juxtapositions along a single axis will be sufficient to facilitate the address associating process, more complex systems are contemplated wherein tags may express positions in two or even three dimensions and where relative juxtapositions may have to be determined in two or even three dimensions in order to associate devices with tags. Systems for two and three dimensional tag-device association are contemplated here, their detailed descriptions foregone in the interest of simplifying this explanation.

In some cases the tagging paradigm used to tag inputs and outputs during programming may not include sufficient information itself to determine relative juxtapositions of all line devices (i.e., to determine the device positions). For instance, in some cases, instead of using tags such as "$1^{st}$ station, $1^{st}$ device", the tagging paradigm may use relatively more intuitive tags like "mill station, $2^{nd}$ sensor" and "spray station, $2^{nd}$ actuator". In this case, because the tags themselves do not include enough information to determine relative juxtapositions of the corresponding devices along the direction of lien transfer 79, (i.e., while it is clear that a $1^{st}$ station, $1^{st}$ device comes before a $1^{st}$ station, $2^{nd}$ device or a $2^{nd}$ station, $1^{st}$ device, it is unclear based on the tags alone whether or not a mill station, $1^{st}$ sensor comes before or after a mill station $1^{st}$ actuator or a drill station, $1^{st}$ sensor, along a transfer line), some additional tool (e.g., see 402 in FIG. 1) may have to be accessed by server 105 to match or associate tags with devices in a constructed machine.

Here, it is contemplated that, in at least some embodiments, the additional tool will include additional information from which the intended relative juxtapositions of specific line devices can be gleaned. For instance, a line specification, map or schematic diagram that illustrates or indicates intended relative juxtapositions of stations and specific line devices may be employed. For instance, in some cases, a line map corresponding to a specific set of PLC programs may include a separately labeled device icon for each of the PLC program inputs and outputs where the separate labels match the R-jux tags in the PLC programs. For example, referring again to FIG. 2, sensor 62 may be labeled "transfer line, $1^{st}$ sensor", actuator A3 may be labeled "mill station, $3^{rd}$ actuator", sensor 68 may be labeled "mill station, $2^{nd}$ sensor", and so on. Here, server 105 may be programmed to glean the labels and their relative juxtapositions from a schematic of line ML1 and use the gleaned information to form an R-jux tag list ordered as a function of relative juxtapositions specified by the line schematic.

An exemplary sub-process 258 that may be added to the method 100 of FIG. 5 and that is consistent with the above comments is illustrated in FIG. 6. Referring also to FIGS. 1, 2 and 5, after an un-ordered R-jux tag list is formed at block 104, control passes to block 262 of FIG. 6. At block 262, server 105 examines a line schematic like the schematic of FIG. 2 and gleans the order of the stations therefrom as well as the juxtapositions of the sensors and actuators at each of the stations. At block 264, server 105 re-orders the tags in the list to reflect an order of the devices consistent with the gleaned information. Here, for example, independent of the order of the tags used in the PLC programs, the re-ordered tag list for line ML1 in FIG. 2 may be as illustrated in the exemplary database 99' shown in FIG. 7 that includes tag and address columns 97' and 101', respectively, the tag list beginning with "transfer line, $1^{st}$ sensor" and ending with "unload station, $1^{st}$ sensor". After block 264, control passes back to block 106 in FIG. 5 where process 100 continues in the manner described above.

Figure 8:
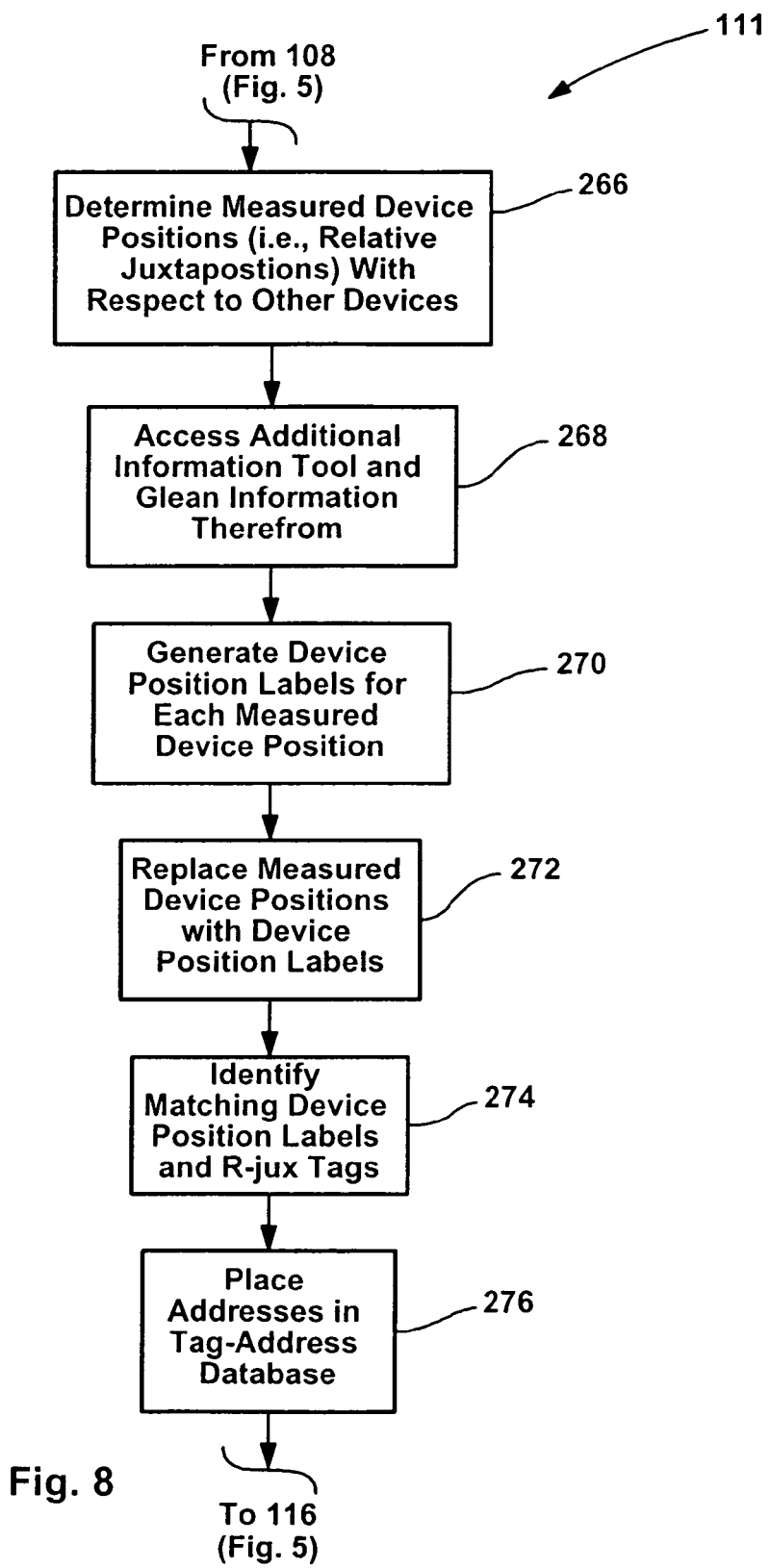
FIG. 8 is a sub-process which may be added to the process of FIG. 5 to provide an enhanced inventive method.

According to yet another inventive method, instead of re-ordering tags in a list as a function of information in another tool like a map or a schematic, server 105 may be programmed to assign device position labels to devices after relative juxtapositions of the devices have been determined where the labels are consistent with both information from an additional tool (e.g., a map or schematic) and with the program tagging paradigm. To this end, referring again to FIG. 2, here it will be assumed that the line ML1 schematic is accessible to server 105. Referring also to FIG. 8, a sub-process 111 that may be substituted for blocks 109 and 110 of FIG. 5 is illustrated. Referring also to FIG. 5, after the juxtapositions (i.e., anchor related positions) of devices with respect to the anchor device have been determined at block 108, control passes to block 266 in FIG. 8 where the juxtaposition information from block 108 is used to determine the relative juxtapositions of the line devices with respect to each other. Hereinafter, unless indicated otherwise, these relative juxtapositions of devices that are determined by server 105 from device location measurements will be referred to as "measured device positions". The measured device positions are stored along with associated device addresses. Next, at block 268, the line schematic or other additional information tool is accessed and information is gleaned therefrom that can be used to generate device position labels for each of the measured device positions.

At block 270 the device labels are generated. For instance, referring again to FIG. 2, where the measured device position for actuator A3 is "seventh device," server 105 gleans information from the ML1 schematic (i.e., FIG. 2) to generate the device position label "mill station, $3^{rd}$ actuator" for the seventh device. At block 272, server 105 replaces each of the measured device positions with the device position labels derived from the gleaned information. In the previous example, the measured position "seventh device" is replaced with the device position label "mill station, $3^{rd}$ actuator". The device position labels are stored with associated device addresses.

Continuing, at block 274, server 105 compares the device position labels to the R-jux tags and at block 276, for each matching label-tag pair, places the network address associated with the label into the tag address database. Next, control passes back to block 116 in FIG. 6.

Here, in at least some cases where device position labels that are exactly the same as R-jux tags in programs can be generated from information gleaned off schematics or other information tools, the steps requiring generation of a tag list and population of a tag-address database may not be required. Instead, generation of the label list and association of the labels with the device addresses should serve the same purpose as the tag-address database.

In some cases only partial labels may be textually provided on a schematic and other labeling information may have to be gleaned from other schematic characteristics. For instance, whether or not a device is a sensor or an actuator and the order of the sensors and actuators at each station, may have to be gleaned from a line schematic. For example, in FIG. 2, the stations are separately labeled but the sensors and actuators are not separately labeled with textual labels. In this case, server 105 may be programmed to glean the nature of each device (i.e., sensor or actuator) from an associated device icon on the schematic and the relative juxtaposition of each device from the relative position of the device to other devices on the schematic. In FIG. 2, for instance, server 105 may be programmed in this case to recognize that sensor icons correspond to sensors and that actuator icons correspond to actuators so that sensor 66 can be distinguished from actuator A1, so that sensor 68 can be recognized as the second sensor at mill station 53, and so on.

While a substantially automated system is described above, it should be appreciated that other less automated systems for identifying measured device positions are also contemplated. For instance, in some embodiments of the invention, relative juxtapositions of devices may be manually measured by a commissioning engineer and entered into the network system to be associated with devices as they are linked to the network. Here, during a commissioning procedure, after a device is positioned for operation, a commissioning engineer may plug the device into network 34 after which server 105 identifies the most recently connected device and associates that device with location information entered by an engineer via an interface device commensurate therewith. In this case, unlike the automated systems described above, the sensors and actuators do not have to include separate transmitters (e.g., 71, 73, etc.).

Figure 9:
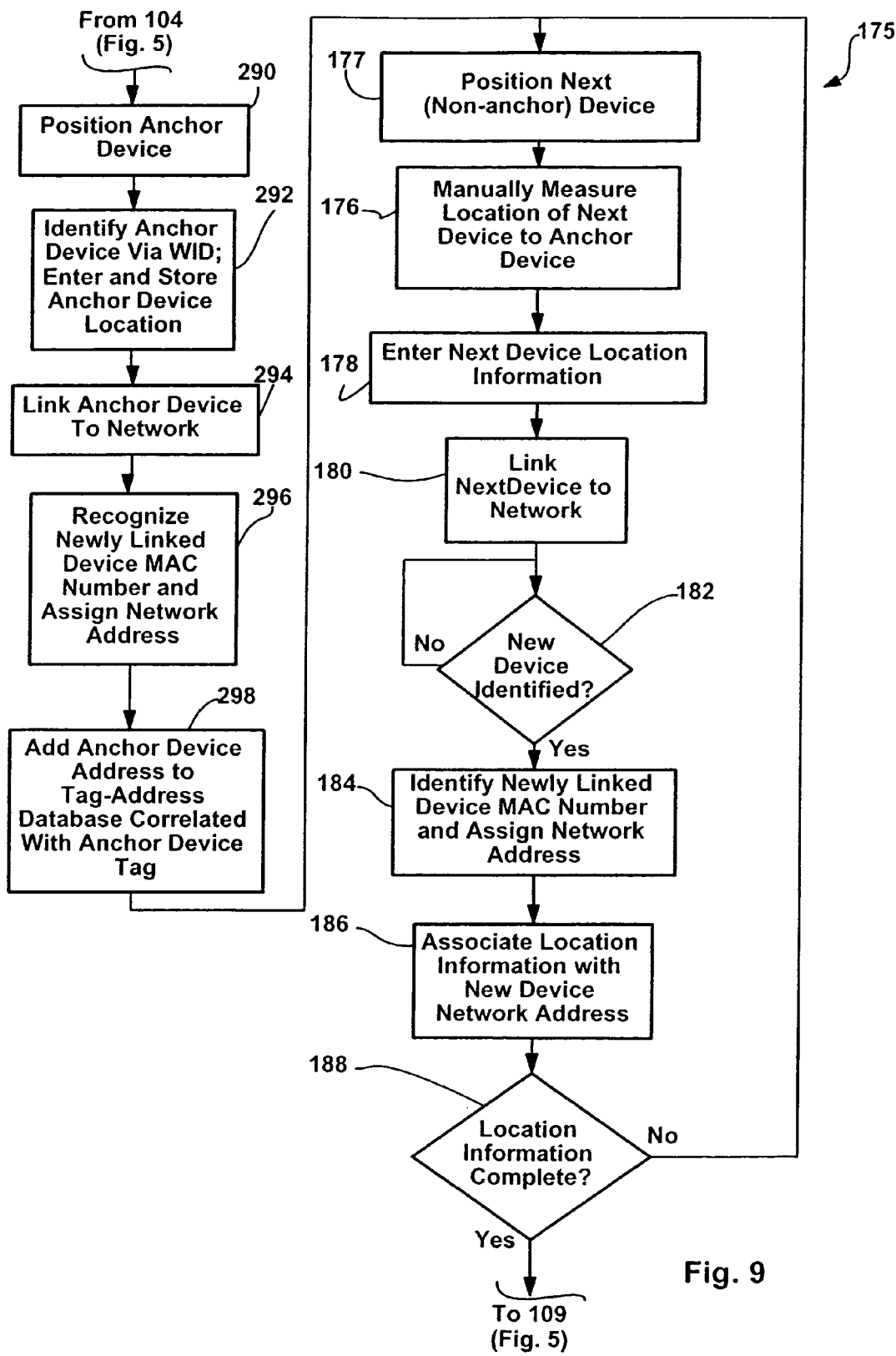
FIG. 9 illustrates a sub-process that may be substituted for a portion of the process of FIG. 5.

Consistent with the comments above, FIG. 9 illustrates a sub-process 175 that may be substituted for process blocks 106, 107, 119 and 108 in FIG. 5. Referring also to FIGS. 1, 2 and 5, after a PLC program tag list has been generated at block 104, control passes to block 290 in FIG. 9. At block 290, an engineer positions an anchor device at the location within facility 10 at which the anchor device will be employed. Here, as above, it will assumed that sensor 62 is the anchor device. At block 292, the engineer determines the location of the anchor device and provides that location to server 105 via some type of interface device. In this case, it will be assumed that the engineer uses WID 30 to enter the anchor device location and to transmit that location information to server 105.

In addition, at block 292, the engineer identifies the anchor device as a specific one of the line devices. To aid the engineer in identifying the specific anchor device, server 105 may provide the tag list from database 99' (see FIG. 7) to the engineer via WID 30 and a selection tool. When one of the list tags is selected, the selection may be transmitted to server 105 via access points 11. Server 105 stores the manually entered anchor device location along with the selected tag as a correlated pair.

After the anchor device location and identity have been entered at block 292, WID 30 may be programmed to request that the anchor device be linked to the network. Continuing, at block 294 the engineer links the anchor device to network 34.

At block 296, server 105 poles the network for the MAC number of the newly linked anchor device and assigns a network address to the anchor device. At block 298 server 105 correlates the anchor network address with the R-jux tag that was selected at block 292 and adds the address to database 99'.

At block 177, the commissioning engineer positions one of the non-anchor devices (i.e., a next device) at the location at which the device will be employed along line ML1. At block 176, the engineer manually measures the location of the next device with respect to the anchor device (i.e., measures the anchor related position). At block 178, the engineer provides the anchor related position of the device to server 105 via WID 30. At block 180, the engineer links the non-anchor device to network 34 and at block 182 server 105 polls the network for a newly linked device MAC number. When a new MAC number is identified at block 184, controller 105 assigns a network address to the new device and causes the newly linked device to store the address for subsequent communication. At block 186, server 105 associates the anchor related position of the device with the network address of the new device and stores the address-location data as a correlated pair.

At block 188, where additional devices have to be added to the line, control passes back up to block 177. Eventually, after line ML1 has been completely constructed, control passes from block 188 back to block 109 in FIG. 5. At this point, a database including the relative juxtapositions of each of the line devices with respect to the anchor device has been stored where each one of the relative juxtapositions is correlated with a different one of the network addresses of the devices. At block 109, process 100 continues such that the anchor related positions are converted into measured device positions (i.e., converted into relative juxtapositions with respect to all of the line devices), and so on.

While various automated processes and other generally manual processes are described above, additional hybrid processes that include a blend of manual and automated aspects are contemplated. To this end, in at least some embodiments, it is contemplated that a WID 30 may be used in conjunction with axis points 11 to streamline and generally automate the manual process of measuring line device positions. To this end, FIG. 10 illustrates a sub-process 164 that may be substituted for blocks 176 and 178 in FIG. 9. Referring also to FIGS. 1, 2 and 9, after a line device has been positioned within facility 10 in a location in which the device is to operate at block 177, control passes to block 159 in FIG. 10. At block 159, the engineer positions a WID 30 proximate one of the non-anchored devices. Here, the term "proximate" may mean relatively closer to the device for which location is to be determined than to other line devices. Next, at block 160, the engineer initiates a process whereby the location of the engineers WID 30 is determined via access points 11 and server 105. Here, as above, WID location maybe determined by transmitting signals from the WID 30 to access points 11 to generate data useable by server 105 to determine WID location. Once WID 30 location is determined, the location is stored by server 105.

After block 160 in FIG. 10, control passes back to block 180 in FIG. 9 where the process described above continues. More specifically, after the WID location has been stored, server 105 poles network 34 for a next device to be linked, assigns a network address to the next device linked and associates the same address with the location of the WID. Process blocks 159 and 160 are performed for each of the devices that are added to machine line ML1 to simplify the device position determining process.

Here, in at least some embodiments, WID 30 may also be used to determine the location of the anchor device at block 292 in FIG. 9. In this case, a process similar to that described above with respect to FIG. 10 will be employed wherein, after the anchor device is positioned within the facility, the WID is positioned proximate the anchor device and WID location is determined when the engineer initiates the location determining process.

Referring once again to FIG. 2, in at least some embodiment, it is contemplated that a bar code or similar type of information specifying label 400 (only one shown) or device (e.g., an RF ID tag ) may be provided on each or at least a sub-set of the line devices that is readable via the WID reader 48. In this case, the bar code or other device may specify the MAC number assigned to the specific device. While various types of information labels 400 and readers 48 are contemplated, unless indicated otherwise, the present invention will be described in the context of a bar code label and associated reader.

FIG. 11 illustrates a sub-process 162 that may be substituted for blocks 106 through 108 in FIG. 5 whereby bar code labels are employed to provide additional advantages. Referring also to FIGS. 1, 2 and 5, after an R-jux tag list is formed at block 104, control passes to block 171 in FIG. 11.

At block 171, bar code labels are provided on each of the line devices where each of the labels indicates the MAC address of the device to which it is attached. At block 173 the line is constructed. As described above, when a new device is linked to network 34, server 105 obtains the MAC number therefrom and assigns and transmits a network address thereto for storage threat. In addition, at block 173, after a network address is transmitted to a device, server 105 stores the MAC number and network address as a correlated pair. At block 187, during the first pass through block 187, for a first device, an engineer places his WID 30 proximate the bar code label on the first device and initiates a process whereby the information on the bar code label is obtained by WID 30 and is transmitted to access points 11. More specifically, WID 30 is used to obtain the MAC number of the first device and transmits that MAC number to server 105 via access points 11. Server 105 uses the information from the access points to perform two processes. First, server 105 uses data from the access points to determine WID 30 location and hence the location of the first device. Second, server 105 uses the MAC number to identify the network address that was correlated with the MAC number to form a correlated pair at block 173. Once the correlated network address and the location of the first device are determined, server 105 correlates the address and the location and stores those values as a correlated pair at block 187.

Next, at block 179, where additional device locations have to be determined, control passes back up to block 187 where the engineer places his WID 30 proximate a next one of the line devices and repeats the sub-process associated with block 187. Eventually, at block 179, after all the device locations have been determined and have been correlated with network addresses for specific devices, control passes back to block 109 in FIG. 5.

Despite advances in automatic location determining systems like the wireless access point based system described above, it has been recognized that most location determining systems cannot distinguish locations that are extremely close together. Nevertheless, it is also recognized that an automated location determining system can be used in many cases to uniquely identify a large percentage of line device locations or relative juxtapositions. For example, in some cases, while 15% of sensors and actuators may be too close to other sensors and actuators along a line for an automated location determining system to distinguish the locations of the sensors and actuators, the other 85% of the sensors and actuators may be sufficiently separated that an automated system can uniquely distinguish their locations. Based on the above realizations, according to at least some inventive embodiments, a hybrid system may be provided wherein all line devices include transmitters and, wherein, after a machine line has been configured, server 105 attempts to automatically identify device network addresses and to associate those addresses with PLC program tags (i.e., R-jux tags) in a tag/address database like the one illustrated in FIG. 7. Thereafter, when the locations or relative juxtapositions of at least a subset of the line devices cannot be uniquely determined automatically, server 105 may provide tools that aid an engineer in correlating R-jux tags with specific devices.

Figure 12:
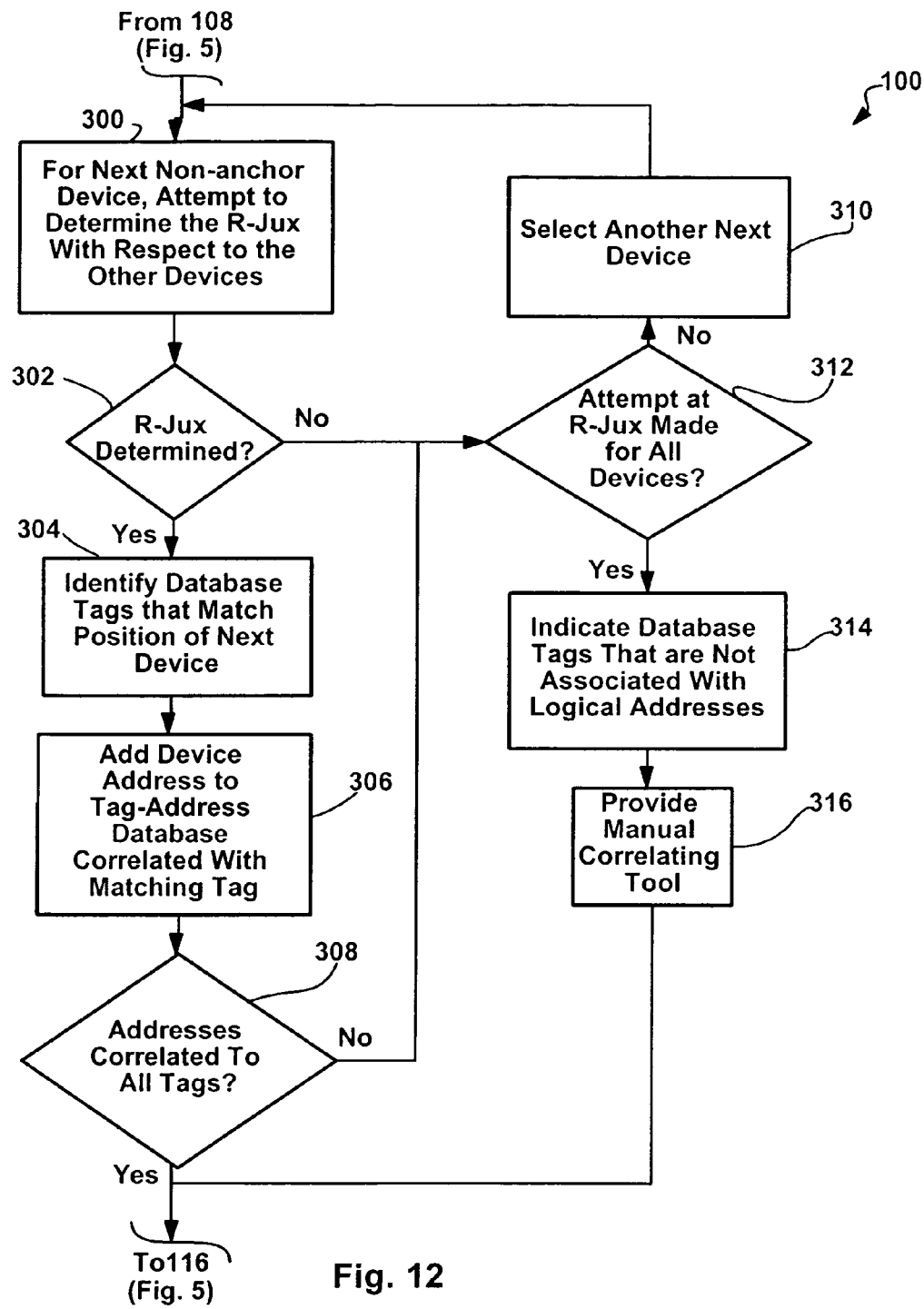
FIG. 12 is a sub-process that may be substituted for a portion of the process illustrated in FIG. 5

Consistent with the comments above, FIG. 12 illustrates a sub-process 100 that may be substituted for blocks 109 and 110 in FIG. 5. Referring also to FIGS. 1, 2 and 5, at process block 108 in FIG. 5, it is contemplated that the step of determining anchor related device positions (i.e., the juxtapositions of line devices with respect to the anchor device) will yield mixed results. Here, while an anchor related position will be generated for each one of the line devices, at least a subset of the anchor related positions will be similar such that distinguishing one device from another as a function of the automatically determined juxtapositions will not be possible. For instance, in FIG. 2, it may be impossible, based on the automatically identified anchor related positions of sensor 66 and actuators A1 and A2, to distinguish those devices from each other.

After block 108 in FIG. 5, control passes to block 300 in FIG. 12. At block 300, for a next device (i.e., a non-anchor device), server 105 attempts to determine the relative juxtaposition of the next device with respect to the other line devices (i.e., attempts to determine the measured device position). In the example above, where the server cannot distinguish between the anchor related positions of sensor 66 and actuators A1 and A2, at block 302, control passes to block 312. At block 312, where server 105 has not yet attempted to determine a measured device position for each of the line devices, control passes up to block 310 where one of the devices for which server 105 has not attempted to determine a measured device position is selected as the next device. After block 310, control passes again to block 300. Eventually, at block 302, in most cases, server 105 will be able to identify a measured device position for at least one of the line devices and will generate a device position label therefore. Thereafter control passes to block 304. At block 304, server 105 locates the R-jux tag in column 97' of database 99' that matches the device position label identified at block 302 and at block 306 server 105 correlates the next device address with the matching R-jux tag in database 99' to automatically fill in at least a part of column 101'.

Continuing, at block 308, server 105 determine whether or not a network address has been correlated with each of the R-jux tags in database 99'. Where a network address has not been provided for each of the tags in database 99', control passes back up to block 312. In cases where addresses have been provided for all of the tags in database 99', control passes back to block 116 in FIG. 5.

Referring still to FIG. 12 and, specifically, to decision block 312, where server 105 has attempted to identify measured device positions for all of the line devices and was unable to identify a measured device position for at least one of the line devices, control passes from block 312 to block 314. At block 314, server 105 indicates the database tags that have not been associated with network addresses in database 99'. This indication process 314 may entail transmitting the list of unassociated tags to the configuring engineer via the engineer's WID 30. For instance, in the example above where server 105 was unable to distinguish the relative juxtapositions of sensor 66 and actuators A1 and A2, server 105 may transmit a list of R-jux tags including "mill station, $1^{st}$ sensor", "mill station, $1^{st}$ actuator" and "mill station, $2^{nd}$ actuator" along with instructions instructing the engineer that network addresses have not been associated with for those specific PLC program tags and requesting that the engineer manually distinguish sensor 66 and actuators A1 and A2 in some fashion.

In at least some cases, after block 314, control may pass to a block 316 where a manual correlating tool can be provided for the engineer. For instance, in at least some embodiments, the manual tool may enable the engineer to select one of the list of unassociated tags via the engineer's WID 30 and then perform some process whereby that selected device is indicated to server 105. For instance, in the case of a sensor, the process of indicating the specific device may including simply tripping the sensor commensurate with selection of the sensor device via WID 30. In the case of an actuator, the process of indicating the specific actuator may require disconnecting the actuator from the network and reconnecting the actuator after the actuator is selected from the device list via WID 30. Here, after the actuator is reconnected to the network, server 105 may pole the network to identify the newly connected device as described above. In other cases the manual correlating tool may simply instruct the engineer to manually enter network addresses for each one of the unassociated tags. Other manual correlating methods and tools are contemplated. After block 316, a complete database 99' has been constructed and control passes back to block 116 in FIG. 5.

In at least some cases, it has been recognized that a WID 30 can be used to streamline the process of correlating network device addresses with R-jux tags in other ways. For example, in at least some embodiments of the invention, instead of identifying the relative juxtapositions of machine line devices, a WID 30 may be used to provide a location specific list of PLC program tags (i.e., R-jux tags) that have not been associated with network addresses of devices that are to reside proximate an instantaneous location of the WID 30. In addition, WID 30 may be equipped to identify the logical addresses of specific line devices by reading MAC numbers from bar code labels, correlate the MAC numbers with network addresses as described above, and then correlate the logical addresses with user indicated R-jux tags.

Figure 13:
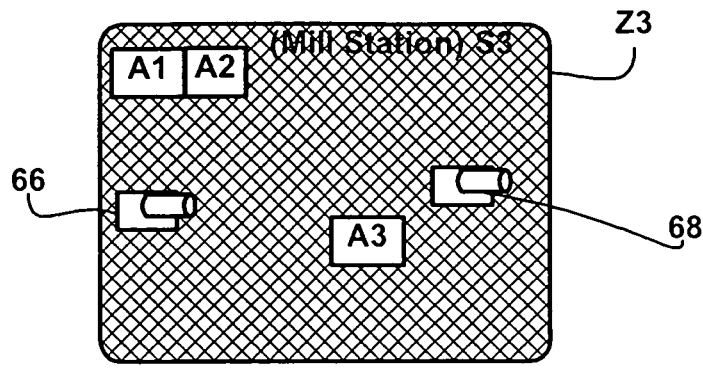
FIG. 13 is a schematic diagram illustrating devices disposed at one of the stations of FIG. 2 and also illustrating a zone associated with the specific station.

To this end, referring now to FIG. 13, an exemplary schematic corresponding to the mill station S3 of FIG. 2 is illustrated where the sensors 66 and 68 and actuators A1, A2 and A3 are shown in a top plan view. In addition, in FIG. 13, a zone Z3 corresponding to mill station S3 is shown in double cross-hatch. Here, it is contemplated that, once a space within facility 10 is associated with a specific machine line ML1 and after the machine line has been configured, separate zones like zone Z3 may be associated with each one of the line stations or, in deed, in at least some embodiments, with each one of the lines. Here, it is contemplated that when an engineer enters zone Z3 with his WID 30 activated, server 105 may be programmed to determine the location of WID 30 and provide a list of the devices that should be located within zone 23.

Figure 14:
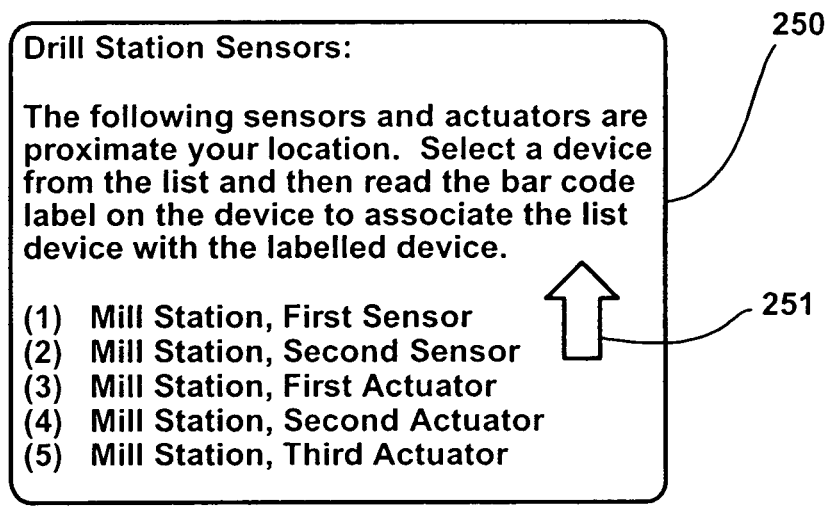
FIG. 14 is a schematic diagram illustrating an exemplary screen shot that may be provided via the display of the WID illustrated in FIG. 3a to facilitate certain aspects of the present invention.

Referring also to FIG. 14, an exemplary WID 30 screen shot 250 illustrates an exemplary view of an R-jux tag list along with instructions for selecting a tag from the list and associating the tag with a specific one of the line devices. Here, consistent with the comments above, the list of tags in FIG. 14 includes the list of R-jux tags associated with station S3. A cursor icon 251 is shown that may be used to select one of the tags from the list Referring now to FIG. 15, an exemplary method 330 consistent with the comments above is illustrated. In this example, it is assumed that a PLC program including R-jux tags exists, that an R-jux tag list for the program exists, that the line ML1 has been constructed, that network addresses have been provided to and stored by each of the line devices and that server 105 has stored correlated pairs of MAC numbers-network addresses for subsequent use.

Figure 15:
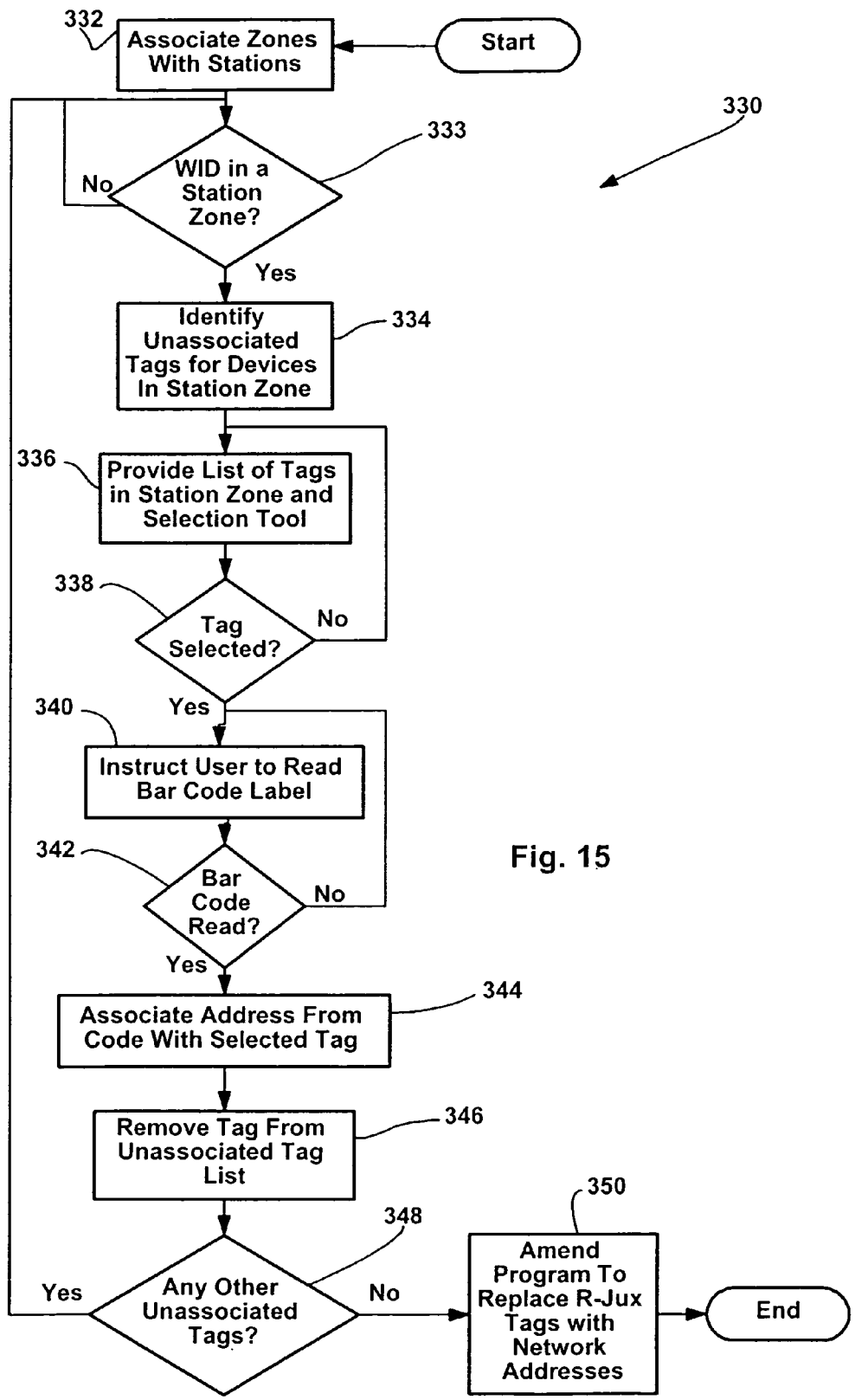
FIG. 15 is a flow chart illustrating yet one more inventive method.

In FIG. 15, method 330 begins at process block 332 where zones are associated with specific machine line stations and R-jux tags are associated with specific zones. Here, the association process may be manual or, in at least some cases, automatic where server 105 gleans information from a line map or the like to identify positions of devices associated with the R-jux tags. At block 333, after a WID 30 has been activated within space 13, server 105 monitors WID location to determine when one of the WIDs is located within one of the station zones. Once a WID is located within a station zone, control passes to block 334 where server 105 accesses an existing tag/address database 99' and identifies all unassociated tags for devices that should be located within the station zone.

Continuing, at block 336, server 105 provides a list of the unassociated tags in the station zone along with a selection tool to the engineer via the engineer's WID 30. Here, the list of tags may have an appearance similar to the screen shot 250 illustrated in FIG. 14. At block 338, server 105 determines whether or not a tag has been selected via WID 30. After a tag has been selected, control passes to block 340 where server 105 instructs the user via WID 30 to read one of the bar code labels on the line device that the engineer wishes to associate with the selected R-jux tag. At block 342, after a bar code label has been read, control passes to block 344 where the MAC number read from the code is associated with the selected tag to form a correlated pair which is transmitted to server 105.

When server 105 receives the associated tag-MAC number pair, server 105 accesses the previously stored MAC number-network address pair that has the same MAC number as the received tag-MAC number pair and correlates the tag and the network address by placing the network address in the tag-address database. At block 346, the selected tag is removed from the unassociated tag list. At block 348, where additional unassociated tags corresponding to the zone still exist, control passes back up to block 333 and the process is repeated. At block 348, once all of the tags corresponding to the zone in which WID 30 currently resides have been associated with network addresses, control passes to block 350 where server 105 amends the PLC program to replace the tags therein with the network addresses.

According to yet one additional aspect of the present invention, it has been recognized that, generally, location and juxtaposition based communication rules can be specified for most automated facilities which can then be used to determine whether or not manually associated network addresses and PLC program tags are likely correct. For example, referring again to FIG. 1, where facility 10 is one of a plurality of facilities that make up enterprise 8 and at least one of the other (N-1) facilities is located miles away from facility 10, it is unlikely that activation of actuators along machine line ML1 should be based upon a signal generated by a sensor in one of the other facilities. Thus, at least one spatial based rule may be that machine line device communications should be restricted to a specific facility and, where some communication that is manually specified calls for inter-facility communication, that specification may be identified as likely incorrect.

As another example, because most machine line operations will not require communication with PLCs, sensors or actuators that comprise another machine line, another spatial based rule may be that whenever a logical address in a PLC program that is associated with a first machine line requires data from or transmits data to a PLC, sensor or actuator in a second machine line, that a likely incorrect address has occurred. Many other spatial based rules are contemplated such as, for instance, a simple distance rule specifying that a likely incorrect address has been specified when a PLC transmits data to or receives data from a device that is 100 feet or more away from the location of the PLC. Moreover, programs themselves may be used by server 105 to automatically generate spatial based rules. For instance, where a program includes R-jux tags that only indicate devices associated with a single machine line (e.g., ML1 in FIG. 1), an inter-line addressing restriction may be identified. As another example, where server 105 has access to line schematics, server 105 may be programmable to determine that a specific sensor to be associated with a specific R-jux tag has to be within a 5×5 foot space upon installation. Here, where the sensor that is associated with the R-jux tag after a manual tag-address process has been performed is not within the required 5×5 foot space—an error may be identified.

Figure 16:
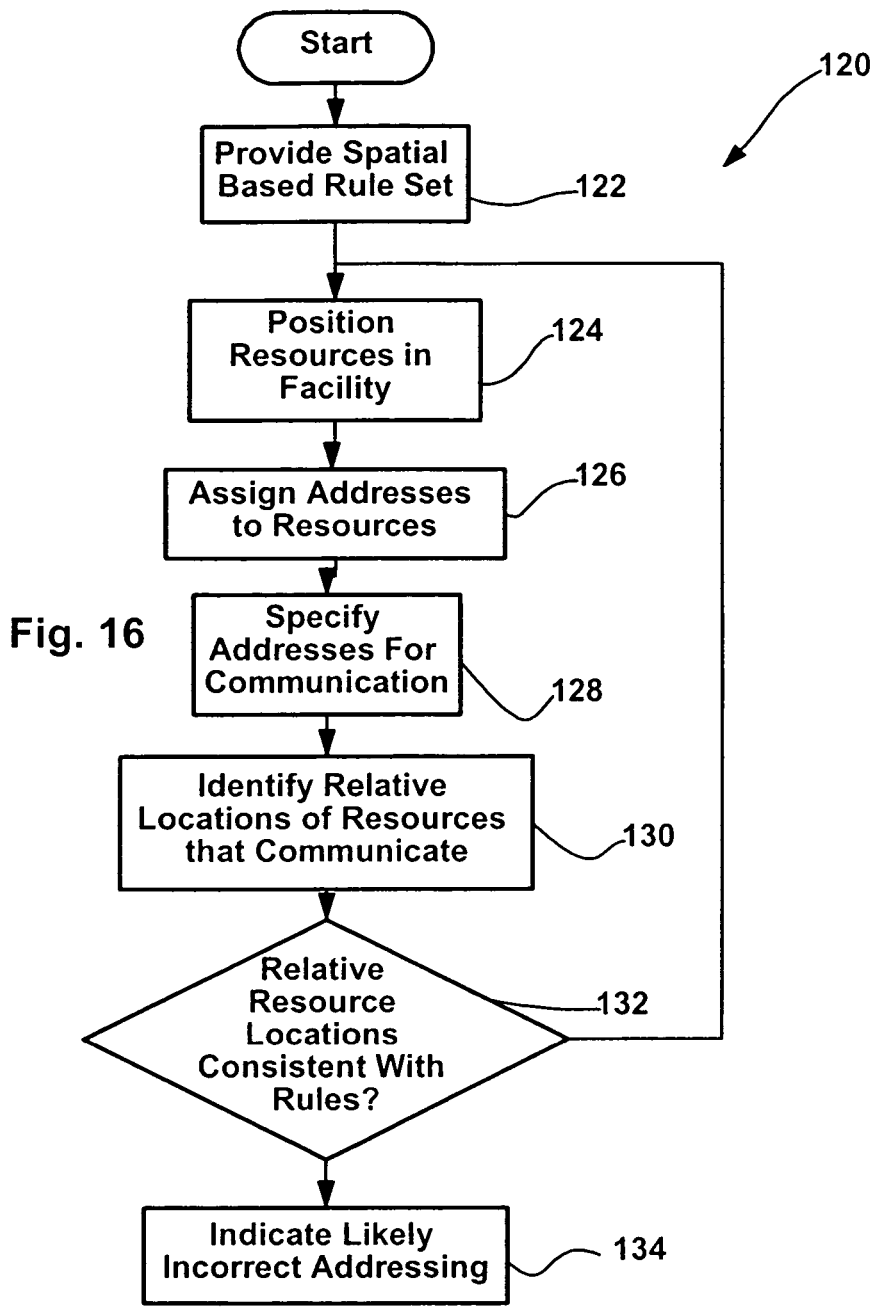
FIG. 16 is a flow chart illustrating an additional method according to the present invention.

Referring now to FIG. 16, one method 120 consistent with the comments above is illustrated. At process block 122, a spatial based rule set is provided for a facility 10 or for an enterprise 8. At block 124, resources including PLCs, sensors, actuators, and machine assemblies are positioned within the facility, are physically integrated and have network addresses assigned thereto. At block 126, a commissioning engineer assigns network addresses to the PLC program or R-jux tags to form a database similar to the database illustrated in FIG. 7. At block 130, server 105 identifies the relative locations of resources that communicate as a function of the PLC program tag and address associations. At block 132, where relative resource locations and communication paths are consistent with the spatial based rule set, control passes back up to block 124. However, where the relative resource locations and specified communication paths are not consistent with the spatial based rule set, control passes to block 134 where server 105 indicates that likely incorrect addressing has occurred. Once again, where WID 30 is used by the engineer, server 105 may indicate likely incorrect addressing via the WID 30.

While the process 130 of FIG. 5 is described as being performed in batch after a complete line has been constructed, it should be appreciated that, in at least some cases, a similar process may be performed in real time as parts of lines are constructed and tag-address associations are made.

In addition to the methods described above, the present invention also contemplates methods wherein network addresses are associated with R-jux tags prior to the addresses being assigned to line devices. Thereafter, relative juxtapositions (i.e., measured device positions) of line devices are determined and are used to generate device position labels which are compared to the R-jux tags. When a match between a device position label and an R-jux tag is identified, the address associated with the R-jux tag is assigned to the device associated with the device position label and is thereafter used to facilitate communication.

Figure 17:
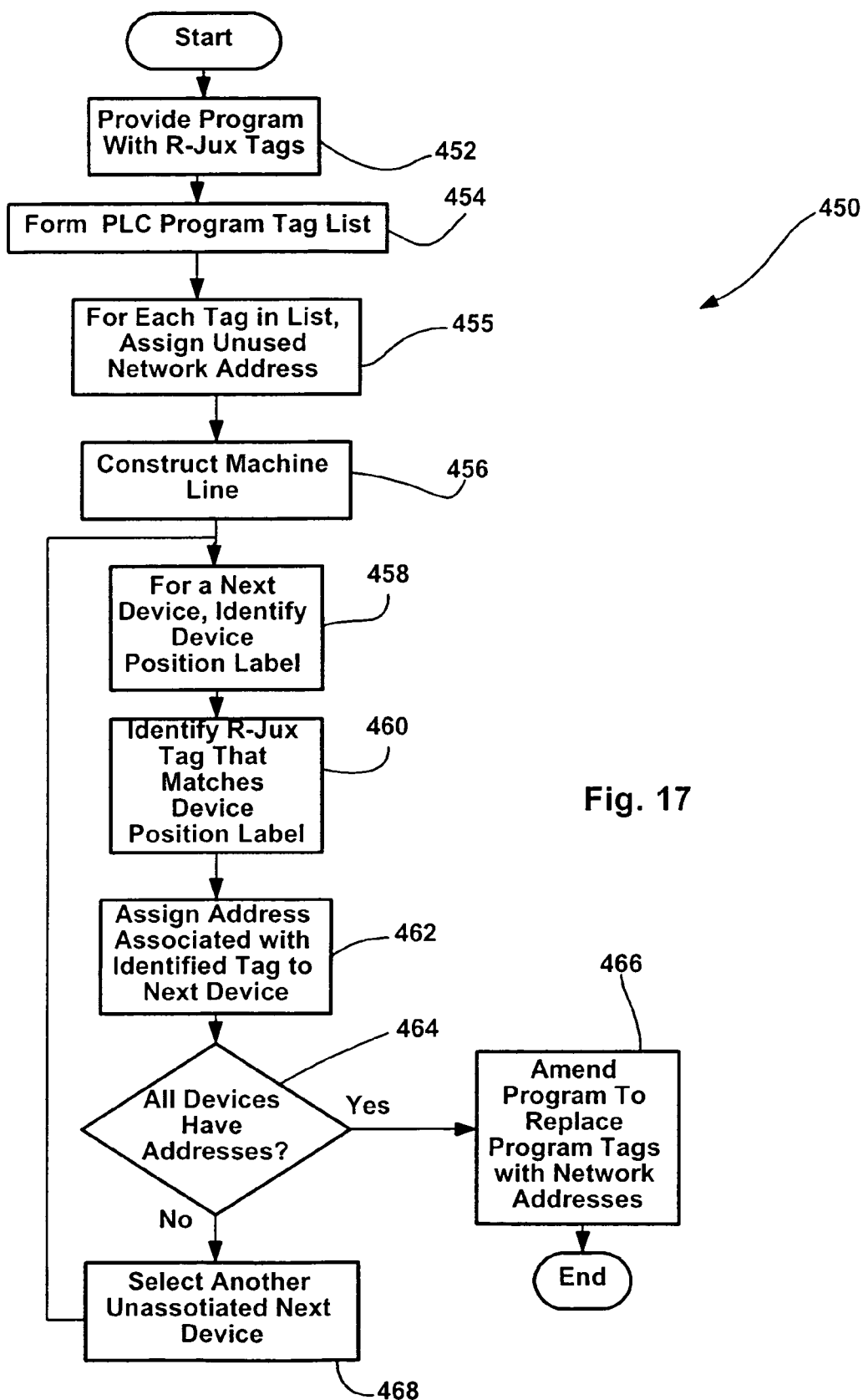
FIG. 17 is a flow chart illustrating a method wherein network addresses are assigned to program tags prior to being assigned to line devices.

Referring now to FIG. 17, one method 450 wherein network addresses are associated with tags prior to being associated with line devices is illustrated. Referring also to FIGS. 1, 2 and 7, at block 452, a PLC program including R-jux tags is provided by a system programmer. At block 454, an R-jux tag list for the PLC program is formed by server 105. At block 455, for each tag in the R-jux tag list, server 105 identifies an unused network address and assigns the unused network address to the tag. Thus, after block 455, a completed tag-address database similar to database 99' in FIG. 7 will be completely populated including both R-jux tags and associated network addresses.

Continuing, at block 456 an engineer configures the machine line. At block 458, for a next device in the machine line, server 105 identifies a device position label. Here, block 458 corresponds to a process wherein the relative juxtapositions of each of the devices with respect to other devices is identified in any of the manners described above and then device position labels are assigned accordingly that are consistent with the tagging paradigm used by the enterprise 8.

At block 460, server 105 identifies the R-jux tag from the tag-address database 99' that matches the device position label of the next device. At block 462, server 105 assigns the network address associated with the identified R-jux tag to the device associated with the device position label. At block 464, where addresses have been assigned to all of the line devices, control passes to block 466 where the PLC program is amended to replace the R-jux tags with the network addresses from column 101' in database 99'. Referring again to block 464, where an address has not been provided for at least one of the line devices, control passes to block 468 where another one of the unassociated devices is identified as the next device after which control passes back up to block 458. The loop including blocks 458, 460, 462, 464 and 468 is repeated until addresses have been provided for all of the line devices.

While the invention may be susceptible to various modifications and alternative forms, specific embodiments have been shown by way of example in the drawings and have been described in detail herein. However, it should be understood that the invention is not intended to be limited to the particular forms disclosed. For example, while the methods are described above as ones wherein a tag-address database is formed that includes R-jux tags from PLC programs and associated addresses, it should be appreciated that a similar database may be formed that includes device position labels and associated network addresses. In these cases, after a label-address table is formed, the labels may be matched with R-jux tags in PLC programs and used to amend in a fashion similar to that described above.

As another example, in some cases, in order to determine relative juxtapositions with respect to an anchor device or other devices, it may be necessary to determine the orientation of the anchor device or the relative orientations of more than one anchor device (i.e., the trajectory between two or more devices).

Moreover, in some cases, juxtapositions of at least some line devices may be determinable in ways other than direct measurement after installation. For instance, in at least some cases it is contemplated that two or more devices may be pre-assembled and tested prior to being delivered for line installation where the entire assembly is installed upon delivery. Here, the precise position of the assembly devices along with the device MAC numbers may be known and provided to server 105. In this case, once the relative juxtaposition of the assembly with respect to other line devices and/or assemblies is known, server 105 may use the pre-determined precise positions of the assembly devices to assign relative juxtaposition or device position labels to the assembly devices.

Furthermore, as indicated above, the invention also contemplates a system where, in at least some embodiments, the software used to generate mechanical and electrical schematics as well as PLC programs enforce identical tagging and device labeling paradigms or conventions so that, once device positions are determined, device position labels can be assigned thereto that match or are at least similar to R-jux tags in the PLC programs.

In addition, other methods having variations from those described above are contemplated. For instance, device MAC numbers may be wirelessly transmitted to server 105 (e.g., via a WID or a device associated transmitter) and used to determine device locations (e.g., via triangulation, strength of signals, etc.) which are in turn used to assign device position labels to compare to R-jux tags. After MAC numbers are associated with an R-jux tags, network addresses may be assigned to the R-jux tags and also to the devices associated with the MAC addresses.

Moreover, in some methods there may be more than one anchor device. For instance, in some cases there may be a separate anchor device for each of the line stations or a separate anchor device for each of the station sub-sets associates with a specific PLC. In some cases only a sub-set of devices (e.g., only anchor devices) may include a transmitter to automate juxtaposition determination and manual determine of locations may be required for other devices.

Moreover, in at least some cases, the methods may only be used to associate a specific type of device with R-jux tags and manual association may be required for other types of devices. For instance, sensors may be automatically associated whereas actuators may have to be manually associated.

Furthermore, in at least some cases it is contemplated that server 105 will maintain a separate network address-anchor device position database after tags and specific devices have been associated that can be used to automatically associate tags with replacement or subsequently moved devices. Here, for instance, where a tag is associated with a first sensor and the sensor is removed to be replaced by another sensor, server 105 may be programmed to determine the location of the new device in some fashion (e.g., manually or automatically), determine the measured position (i.e., the relative juxtapositions of devices with respect to the other devices) of the new sensor based on the anchor related positions of the other line devices and the location of the new device and then associate the new sensor with the address of the replaced sensor by causing the new sensor to store the address of the replaced sensor. In the alternative, once server 105 determines that the new sensor is in the relative position of the replaced sensor, server 105 may assign a new network address to the new sensor and replace each instance of the replaced sensor address in the PLC program with the new sensor's network address. Where a device movement causes a different relative device juxtaposition to result, it is contemplated that at least a sub-process of at least one of the processes described above may have to be performed to re-determine the measured device positions of at least some of the line devices. For instance, when a sensor is moved and the order of sensors along a line is altered, the sensors may have to be re-associated with program tags. Here, to facilitate re-association, server 105 may also store a tag-address database.

Thus, the invention is to cover all modifications, equivalents, and alternatives falling within the spirit and scope of the invention as defined by the following appended claims.

To apprise the public of the scope of this invention, the following claims are made:

What is claimed is:

1. A method for use with at least a first network enabled resource and a second network enabled resource to be arranged to perform a process within a space, the first resource and the second resource each comprising an automation device capable of performing an automation function during the process, the method for validating likely correct first and second resource communications and comprising the steps of:
   providing a first network address for the first resource and a second network address for the second resource;
   providing a spatial rule set including rules that indicate probable relative first and second resource positions;
   specifying that the first resource communicates with the second resource by including the second network address when communicating;
   identifying a relative juxtapositions of the first resource;
   identifying a relative juxtaposition of the second resource;
   associating the relative juxtaposition of the first resource with the first network address;
   associating the relative juxtaposition of the second resource with the second network address;
   determining if the relative juxtapositions of the first and second resources are consistent with the rule set; and
   where, the relative juxtapositions of the first and second resources are inconsistent with the rule set, performing a secondary function.

2. The method of claim 1 wherein the rule set indicates a maximum distance between the second resource and a reference point within the space such that, when the distance between the reference point and the second resource is greater than the maximum distance, the relative juxtapositions of the first and second resources are inconsistent with the rule set.

3. The method of claim 2 wherein the reference point is the location of the first resource.

4. The method of claim 1 wherein the secondary function is to indicate that the specified communication is improbable.

5. The method of claim 1 wherein the method is performed in real time as a resource is added to a sub-set of resources to perform the process.

6. The method of claim 5 wherein the environment includes an automated manufacturing facility.

7. The method of claim 1 wherein the method is performed in batch after a sub-set of resources has been configured to perform the process.

8. The method of claim 1 further including the steps of correlating network addresses with space locations and wherein the step of identifying the relative juxtapositions of the first and second resources includes determining the locations of the first and second resources from the correlated network addresses and using the first and second resource locations to determine relative positions of the first and second resources.

9. The method of claim 1 wherein the environment includes an automated manufacturing facility.

10. A method for use with at least a first network enabled resource and a second network enabled resource to be arranged to perform a process within an environment, the first resource and the second resource each comprising an automation device capable of performing an automation function during the process, the method for validating likely correct first and second resource communications and comprising the steps of:
providing a spatial rule set including rules that indicate probable relative first and second resource positions for resources that communicate with each other and include at least one of a first network address and a second network address when communicating;
associating a relative position of the first resource with the first network address;
associating a relative position of the second resource with the second network address;
specifying a first spatial relationship between the first and second resources;
determining if the specified spatial relationship between the first and second resources is consistent with the rule set; and
where the specified spatial relationship between the first and second resources is inconsistent with the rule set, performing a secondary function.

11. A method for use with a plurality of network enabled resources to be arranged to perform a process, the plurality of resources each comprising an automation device capable of performing an automation function during the process, the method for validating likely correct resource communications and comprising the steps of:
providing a spatial rule set including rules that indicate probable relative resource positions;
correlating logical network addresses with environment locations;
specifying first and second network addresses for a first resource and a second resources, respectively;
specifying that the first resource communicates with the second resource using the specified network address for the second resource;
associating a relative position of the first resource and the second resource with the network addresses of the first and second resources, respectively;
using the network addresses of the first and second resources to determine the relative positions of the first and second resources;
determining if the first and second resource relative positions are consistent with the rule set; and
where the relative positions of the first and second resources are inconsistent with the rule set, performing a secondary function.

12. The method of claim 11 wherein the rule set indicates a maximum distance between the first and second resources such that, when the distance between the first and second resources is greater than the maximum distance, the relative positions of the first and second resources are inconsistent with the rule set.

13. The method of claim 12 wherein the step of performing a secondary function includes indicating an improbable resource configuration.

14. A method for use with a plurality of network enabled resources to be linked via a network within an environment to perform a process and a processor running a program to control the process, the program including at least one of a program input tag and a program output tag for each of the resources, the resources each comprising an automation device capable of performing an automation function during the process, the method for facilitating association of the tags and the resources and comprising the steps of:
associating a space within the environment with the process;
providing at least a first resource that includes the processor;
determining the location of the first resource within the environment; and
when the first resource is proximate at least a sub-space within the space, using the processor to automatically perform the steps of:
(i) identifying the resources to be positioned within the sub-space;
(ii) identifying the tags associated with the resources; and
(iii) indicating the tags associated with the resources.

15. The method of claim 14 further including the steps of, for at least one of the resources, identifying the resource to the network and indicating one of the tags via the first resource that is to be associated with the resource and, wherein, the method further includes the step of associating the identified resource with the indicated tag.

16. The method of claim 15 wherein the step of identifying the resource includes linking the resource to the network.

17. The method of claim 16 wherein the first resource includes a display and wherein the step of identifying the tags includes providing a list of the tags and the step of indicating one of the tags includes selecting one of the tags from the list.

18. The method of claim 15 wherein each of the resources is associated with a network address and wherein the step of associating includes determining the resource address and correlating the resource address with the tag.

19. The method of claim 18 wherein the step of claim 18 is repeated for each resource to be located within the sub-space.

* * * * *